US 12,101,053 B2

(12) United States Patent
Ayers et al.

(10) Patent No.: US 12,101,053 B2
(45) Date of Patent: Sep. 24, 2024

(54) HIGHLY DENSE ARRAY OF PHOTOVOLTAIC MODULES

(71) Applicant: Watershed Solar LLC, Alpharetta, GA (US)

(72) Inventors: Michael R. Ayers, Johns Creek, GA (US); S. Kyle Ehman, Milton, GA (US)

(73) Assignee: Watershed Solar LLC, Alpharetta, GA (US)

( * ) Notice: Subject to any disclaimer, the term of this patent is extended or adjusted under 35 U.S.C. 154(b) by 0 days.

(21) Appl. No.: 16/830,208

(22) Filed: Mar. 25, 2020

(65) Prior Publication Data

US 2020/0366234 A1   Nov. 19, 2020

Related U.S. Application Data

(63) Continuation-in-part of application No. 16/013,616, filed on Jun. 20, 2018, now Pat. No. 10,992,250.

(60) Provisional application No. 62/616,705, filed on Jan. 12, 2018, provisional application No. 62/522,402, filed on Jun. 20, 2017.

(51) Int. Cl.
  *H02S 20/10* (2014.01)
  *H02S 30/10* (2014.01)

(52) U.S. Cl.
  CPC .............. *H02S 20/10* (2014.12); *H02S 30/10* (2014.12)

(58) Field of Classification Search
  CPC .......... H02S 20/10; H02S 30/00; H02S 30/10; Y02E 10/50
  See application file for complete search history.

(56) References Cited

U.S. PATENT DOCUMENTS

| 4,226,256 | A   | 10/1980 | Hawley |
| 9,279,415 | B1* | 3/2016  | Huber ................. H01L 31/0521 |
| 9,628,019 | B1  | 4/2017  | Atcha et al. |
| 10,243,505 | B1 | 3/2019  | Kurtz |
| 10,581,374 | B2 | 3/2020  | Urrutia et al. |
| 2011/0073161 | A1 | 3/2011 | Scanion |
| 2011/0194900 | A1 | 8/2011 | French |
| 2011/0277296 | A1 | 11/2011 | Ramos |
| 2011/0277806 | A1 | 11/2011 | Gillenwater |
| 2012/0266944 | A1 | 10/2012 | Wildes |
| 2013/0056595 | A1* | 3/2013 | Tomlinson .............. H02S 20/22 248/176.1 |
| 2013/0168339 | A1* | 7/2013 | Anderson ............... F24S 25/16 60/527 |

(Continued)

OTHER PUBLICATIONS

PCT International Search Report, PCT/US2021/024051 (Jun. 22, 2021).
PCT Written Opinion, PCT/US2021/024051 (Jun. 22, 2021).

*Primary Examiner* — Angelo Trivisonno
(74) *Attorney, Agent, or Firm* — Baker Donelson; Carl M. Davis, II

(57) ABSTRACT

A plurality of solar photovoltaic modules disposed in spaced-part relation to define a gap between adjacent modules in an array of spaced-apart rows and the modules mounted on respective supports spaced from a surface to define an air gap therebetween, with at least one connector attaching respective adjacent modules, for generation of electricity while resisting wind uplift. A method of arranging interconnected solar photovoltaic modules in spaced-relation is disclosed for electrical generation while resting wind uplift.

13 Claims, 22 Drawing Sheets

(56) References Cited

U.S. PATENT DOCUMENTS

| | | |
|---|---|---|
| 2013/0299655 A1 | 11/2013 | Sader |
| 2015/0256120 A1 | 9/2015 | Anderson et al. |
| 2016/0336895 A1 | 11/2016 | Wildes |
| 2016/0370032 A1* | 12/2016 | Slack .................... F24S 20/20 |
| 2017/0111006 A1* | 4/2017 | Vietas .................... F24S 25/65 |
| 2017/0237389 A1 | 8/2017 | Hudson |
| 2018/0131316 A1 | 5/2018 | Urrutia |
| 2018/0254736 A1 | 9/2018 | Duggal |
| 2018/0269826 A1 | 9/2018 | Urrutia et al. |
| 2018/0367087 A1 | 12/2018 | Ayers |
| 2018/0367090 A1 | 12/2018 | Ayers et al. |
| 2018/0367093 A1 | 12/2018 | Ayers |
| 2019/0056149 A1 | 2/2019 | Thomson |
| 2019/0222162 A1 | 7/2019 | Ehman |

* cited by examiner

HIGHLY DENSE ARRAY OF PHOTOVOLTAIC MODULES

CROSS REFERENCE TO RELATED APPLICATIONS

This application is a continuation-in-part of U.S. patent application Ser. No. 16/013,616, filed Jun. 20, 2018, and claims the benefit of U.S. Provisional Patent Application Ser. No. 62/616,705 filed Jan. 12, 2018 and claims the benefit of U.S. Provisional Patent Application Ser. No. 62/522,402 filed Jun. 20, 2017, incorporated herein in respective entireties by reference.

TECHNICAL FIELD

The present invention relates to electricity generation apparatus of an array of photovoltaic modules disposed across an outdoor surface and methods of arranging photovoltaic modules in spaced relation as an array for generating electricity. More particularly, the present invention relates to solar photovoltaic modules interconnected in spaced-apart relation as a highly dense array of solar photovoltaic modules mounted on supports above an outdoor surface for resisting wind uplift while for generation of electricity.

In one aspect, the present invention relates to photovoltaic modules interconnected in a spaced-relation array supported on an integrated mounting system for use in solar energy collection. In a more specific aspect, the present invention relates to photovoltaic modules interconnected in spaced-relation highly-dense array of solar photovoltaic modules mounted with a minimal ballast or non-ballasted and non-ground penetrating integrated photovoltaic mounting system for use with, and supported by, tufted geosynthetics.

In this application, the following terms will be understood to have the indicated definitions:

- "photovoltaic module"—a module which utilizes the generation of voltage when radiant energy (such as solar energy) falls on the module; sometimes referred to as a solar cell.
- "tufted geosynthetics"—a system which is adapted to cover waste sites and other environmental closures and which is generally comprised of synthetic grass having synthetic fibers tufted to a backing and a geomembrane. Examples of a tufted geosynthetic cover system are shown in Ayers and Urrutia U.S. Pat. Nos. 7,682,105 and 9,163,375. The term "tufted geosynthetics" is also used to refer to a synthetic turf cover system.
- "synthetic grass"—refers to a composite which comprises at least one geotextile (woven or nonwoven) tufted with one or more synthetic yarns or strands and which has the appearance of grass.
- "geomembrane"—refers to a polymeric material, such as high density polyethylene, very low density polyethylene, linear low density polyethylene, polyvinyl chloride, etc.
- "surface"—refers to a surface which has an angle of slope of zero or more.
- "creep"—refers to a behavior of materials (such as soils and geosynthetics) to move or deform slowly under a constant load or stress.

BACKGROUND OF THE INVENTION

Photovoltaic solar modules have historically been mounted by use of a rigid racking system over a variety of surfaces such as rooftops, greenfields and brownfields. These rigid racking systems have required a mounting mechanism to attach onto the photovoltaic module. Typical systems include racking structures that the photovoltaic module must be placed upon and then mechanically fastened to the racking structure.

Racking structures are placed in spaced-relation and the racking structures enable orienting the photovoltaic module at an energy-generating efficient angle. However, the spacing limits the number of photovoltaic modules that can be installed in an area because the angling causes shadows. An adjacent rack must be spaced sufficiently that the photovoltaic modules are not within a shadow area.

Further, the photovoltaic module is a broad planar member that experiences wind uplift forces particularly when orientated at an oblique angle relative to the ground for facing the sun for electricity generation efficiencies. The racking system must be secured so the photovoltaic module resists becoming air-borne in response to wind uplift.

There is a need in the solar industry for an integrated photovoltaic module in which the mounting mechanism is attached to the photovoltaic module and to the base or foundation which eliminates the need for a rigid racking system. The integration allows for an economical alternative to a traditional rigid racking system and enables the increasing of the density of the photovoltaic modules placed at a site for generation of energy, thereby increasing the potential generation of electrical power while allowing flexibility of installation by using non-traditional racking installers.

While use of solar as a renewable alternative energy source has "clean energy" favorabilities, there are drawback to such installations. Solar energy generation sites typically require large tracts of land. In some location circumstances, wooded lands are cleared or farm lands are re-purposed for use as solar energy generation sites. Other sites are significantly remote from tie-in connections to the power transmission and distribution grid of power generating and supply companies. These remote sites require capital expenditures to install and maintain transmission lines to the electrical grid and such transmission lines occupy additional land. Also, recent changes in power generation capacity has decreased reliance on coal and increased reliance on cleaner combustion fuels such as natural gas and, alternatively, power plants that generate electricity with turbines operated with steam heated by nuclear fuel sources. The coal-fired power plants nevertheless have large areas of ash holding ponds or storage areas. These areas are subject to closing with covers such as geomembranes that restrict environmental waters, such as rain or other precipitation or surface water flow, from passing through the covered site and leaching into the ground or pond.

Accordingly, there is a need in the art for an electricity generation apparatus of an array of solar photovoltaic modules disposed in a spaced-relation for generating solar power while resisting wind uplift. It is to such that the present invention is directed.

SUMMARY OF THE INVENTION

The present invention meets the need in the art by providing an array of solar photovoltaic modules for generating electricity, comprising a plurality of solar photovoltaic modules disposed in spaced-part relation in at least two spaced-apart rows, the solar photovoltaic modules mounted on respective supports spaced from a surface to define a gap therebetween. The adjacent solar photovoltaic modules in a respective row spaced a first distance apart and the adjacent row of solar photovoltaic modules spaced a second distance apart from the first row. The gap having a third distance between the surface and the respective solar photovoltaic modules. At least one connector attaching respective adjacent solar photovoltaic modules.

In another aspect, the present invention provides an array of a plurality of solar photovoltaic modules for generating electricity, comprising a first solar photovoltaic module that mounts on a surface. A second solar photovoltaic module mounts on the surface laterally adjacent a first side of the first solar photovoltaic module and spaced a first distance therefrom with at least one connector connecting the first and second solar photovoltaic modules together. A third solar photovoltaic module mounts on the surface adjacent a second side of the first solar photovoltaic module and spaced a second distance therefrom with at least one connector connecting the first and third solar photovoltaic modules together. The respective solar photovoltaic modules disposed at a third distance from the surface and being interconnected define the array that resists wind uplift while generating electricity.

In yet another aspect, the present invention provides an interconnected assembly of an array of a plurality of solar photovoltaic modules for generating electricity, said array comprising a first solar photovoltaic module mounted on a surface and a second solar photovoltaic module mounted on the surface laterally adjacent a first side of the first solar photovoltaic module and spaced a first distance therefrom with at least one connector connecting the first and second solar photovoltaic modules together. A third solar photovoltaic module mounted on the surface adjacent a second side of the first solar photovoltaic module and spaced a second distance therefrom with at least one connector connecting the first and third solar photovoltaic modules together. The respective solar photovoltaic modules disposed at a third distance from the surface and being interconnected define the array that resists wind uplift while generating electricity.

In yet another aspect, the present invention provides a method of arranging a plurality of solar photovoltaic modules in an array for generating electricity, comprising the steps of:
(a) positioning a first solar photovoltaic module on a surface;
(b) disposing a second solar photovoltaic module laterally adjacent a first side of the first solar photovoltaic module and spaced a first distance therefrom with at least one connector connecting the first and second solar photovoltaic modules together;
(c) disposing a third solar photovoltaic module adjacent a second side of the first solar photovoltaic module and spaced a second distance therefrom with at least one connector connecting the first and third solar photovoltaic modules together;
the respective solar photovoltaic modules disposed at a third distance from the surface generally from about horizontal to about 20 degrees relative to the surface and being interconnected defining an array that resists wind uplift while generating electricity.

It is to be appreciated that the solar photovoltaic modules mount to the surface with supports disclosed herein as integrated mounting systems that allow for easy installation on a surface and in particular, supported by a tufted geosynthetic cover. This combination of the integrated mounting system and tufted geosynthetic results in a lower cost, lower maintenance of the surrounding surface, adaptable for a variety of grades from flat to sloping ground and generates more solar power per unit area.

Briefly described, the present invention integrates a photovoltaic module mounting system over tufted geosynthetics on various surfaces (such as a ground cover system, roof, reservoir, pond, etc.). There are two preferred components of this invention that may be combined or used separately within the integrated photovoltaic module mounting system and within any combination thereof.

The first component is one or more anti-creep strip(s) that enhances interface friction between the photovoltaic module and the tufted geosynthetic, while also reducing shearing forces between the photovoltaic module and its mounting surface, thus preventing or substantially preventing sliding forces from mobilizing the module. If desired, a monitoring device can be used to measure the amount of creep.

The second component is a flexible attachment connection which is used, in addition to the anti-creep strip(s), as an additional factor to increase interface friction and to counter potential shearing and uplift forces which could be caused by high wind gusts. The attachment connection can be welded directly to the tufted geosynthetic or the geomembrane and attached to the bottom, top or side of the photovoltaic module. Other means of attaching the connection to the geosynthetic include mechanical means (e.g., screws, bolts, etc.) and adhesive means such as glue, tape, etc.

These two components eliminate the need for ballast compared to a traditional photovoltaic racking system which does not have foundation anchoring. The integrated photovoltaic module mounting system supported by a tufted geosynthetic requires no ballast on a surface. These two components enable multiple configurations (as shown in the drawings).

The result of a non-ballasted integrated photovoltaic module mounting system allows for a lower cost and increased power generation through higher density of module placement at an energy generation site. An additional advantage of an integrated photovoltaic module mounting system is that the system does not require grounding.

The integrated photovoltaic module mounting system of this invention allows for a higher density (i.e., one or more) of photovoltaic modules in a defined area as compared to traditional systems, and a higher density of modules enables the integrated photovoltaic module mounting system to provide more electrical power per unit area.

More particularly described, the present invention meets the need in the art by providing an integrated photovoltaic module mounting system for use in mounting a photovoltaic module to tufted geosynthetics, comprising at least one elongated base plate and at least one elongated rail, said elongated rail coupled to and longitudinally aligned with said base plate with a plurality of rail fasteners coupling said base plate and said elongated rail. A plurality of photovoltaic module fasteners for coupling said rail with the photovoltaic module, and an anti-creep strip coupled to a bottom surface of said base plate.

In another aspect, the present invention provides an integrated photovoltaic module mounting system for use in mounting a photovoltaic module to tufted geosynthetics, comprising at least one elongated rail and a plurality of first fasteners for coupling said rail with the photovoltaic module, and an anti-creep strip coupled to a bottom surface of said rail.

In yet another aspect, the present invention provides an integrated photovoltaic module mounting system for use in mounting a photovoltaic module to tufted geosynthetics, comprising at least one elongated base plate, said base plate having a base member, two opposing side walls each having an inwardly extending lip to define a base plate slot therebetween having a selected slot width, with a plurality of first fasteners for coupling said base plate with the photovoltaic module, said first fasteners having a mounting plate with a selected width less than said selected slot width and a selected length greater than said selected slot width. An anti-creep strip couples to a bottom surface of said base plate, said anti-creep strip including a support and a plurality of projections depending downwardly from said support.

In yet another aspect, the present invention provides a method of mounting a photovoltaic module for use with tufted geosynthetics, comprising the steps of:
(a) coupling an anti-creep strip to a bottom surface of an elongated rail;
(b) positioning the anti-creep strip onto a portion of a tufted geosynthetics covering a surface; and
(c) coupling a photovoltanic module to the elongated rail, wherein the photovotanic module generates electricity and the anti-creep strip inter-engaged with the tufts of the tufted geosynthetics resists wind uplift.

Objects, advantages and features of the present invention will become apparent upon a reading of the following detailed description in conjunction with the drawings and the appended claims.

DETAILED DESCRIPTION

The present invention provides an electricity generating apparatus of a plurality of spaced-apart photovoltaic modules spaced from a ground surface and interconnected for resisting wind uplift, and more particularly disclosed supported by an integrated photovoltaic module mounting system for use with a tufted geosynthetic system on a surface without a racking structure and without ballast for support.

In a particular embodiment, the essential components are a tufted geosynthetic system and one or more integrated photovoltaic module mounting systems which support the solar photovoltaic modules interconnected in spaced relation and spaced from the tufted geosynthetic system, for generation of electricity while resisting wind uplift.

Cover System

Examples of tufted geosynthetic systems useful in the integrated photovoltaic module mounting system of this invention are the covers marketed by Watershed Geosynthetics LLC under the registered trademarks ClosureTurf and VersaCap. These covers 11 comprise a composite of at least one geotextile 213 which is tufted with a plurality of spaced-apart tufts 215 with one or more synthetic yarns (i.e., a tufted geosynthetic) to simulate grass blades in a synthetic grass, and an impermeable geomembrane 217 comprised of a polymeric material.

The synthetic grass blades of the system may contain an infill material and/or a material for protection of the synthetic grass blades against ultraviolet rays.

Solar Module

One or more mono- or multi-crystalline solar modules can be used in the integrated photovoltaic module mounting system of this invention, such as commercially available polycrystalline silicon solar modules. Examples of effective solar modules are available from BYD (China) under the designation BYD 260P6C-30-DG and from Trina (China) under the designation Solar Duomax TSM-PEG14, Tallmax PE14A, and BYD P6C-36. An alternate embodiment discussed below gainfully uses a bifacial solar module. As discussed below, a plurality of the solar modules interconnect in spaced-relation for an array for generating electricity while resisting wind uplift.

Figure 1:
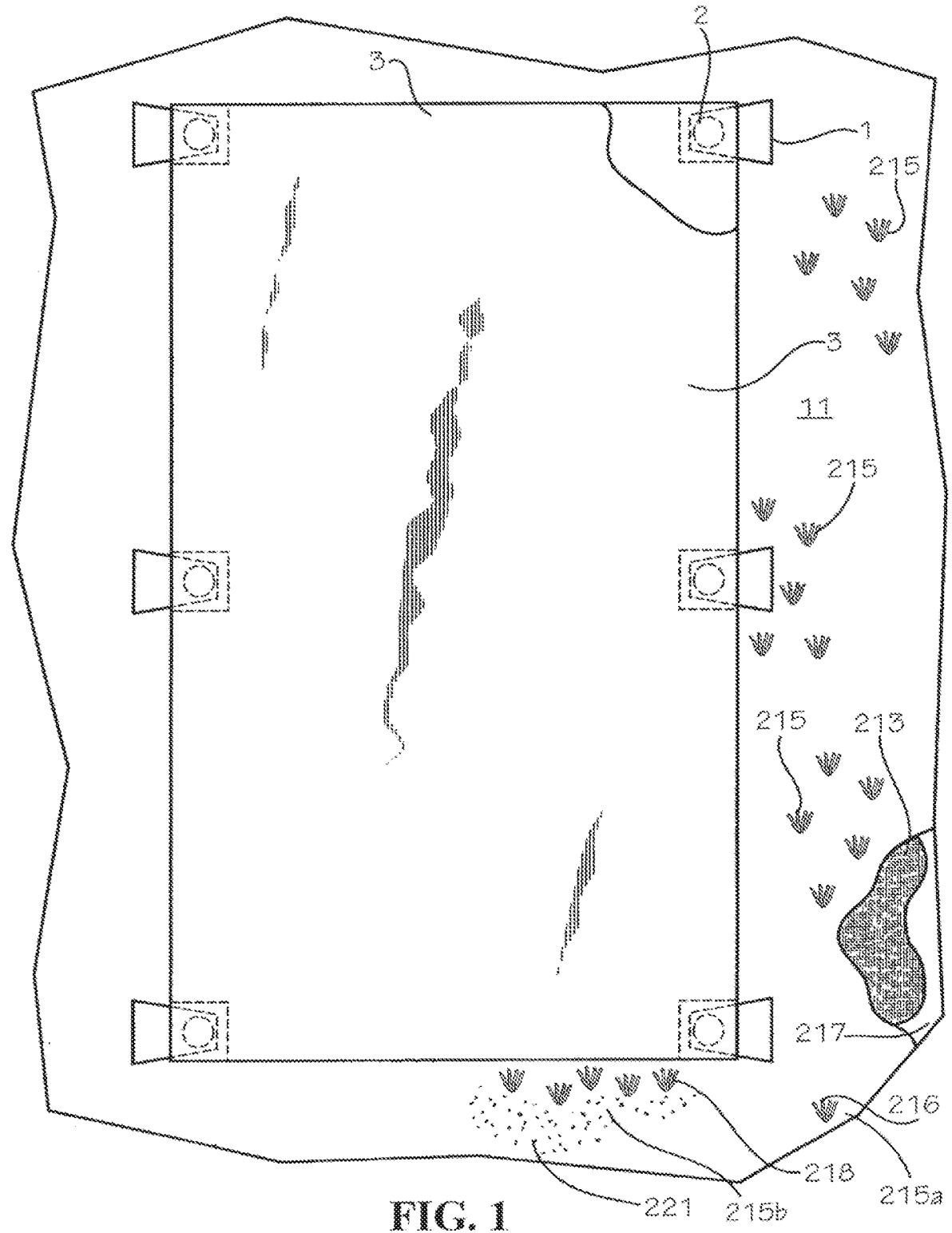
FIG. 1 illustrates multiple flexible attachment connections (i.e., single weld harnesses) mounted on a photovoltaic module.

Referring now to the drawings, in which like numerals represent like elements, FIG. 1 shows in top view multiple single weld harnesses 1 secured by a mounting baseplate 2 attached to a solar module 3. The weld harnesses 1 or tabs that extend flexibly laterally from a side edge of the solar module 3 and attach to at least some of the plurality of tufts 215. The attaching may be accomplished by mechanically attached such as with a fastener, chemically attached, welding (heat or sonic), or thermoset bonding.

Figure 1A:
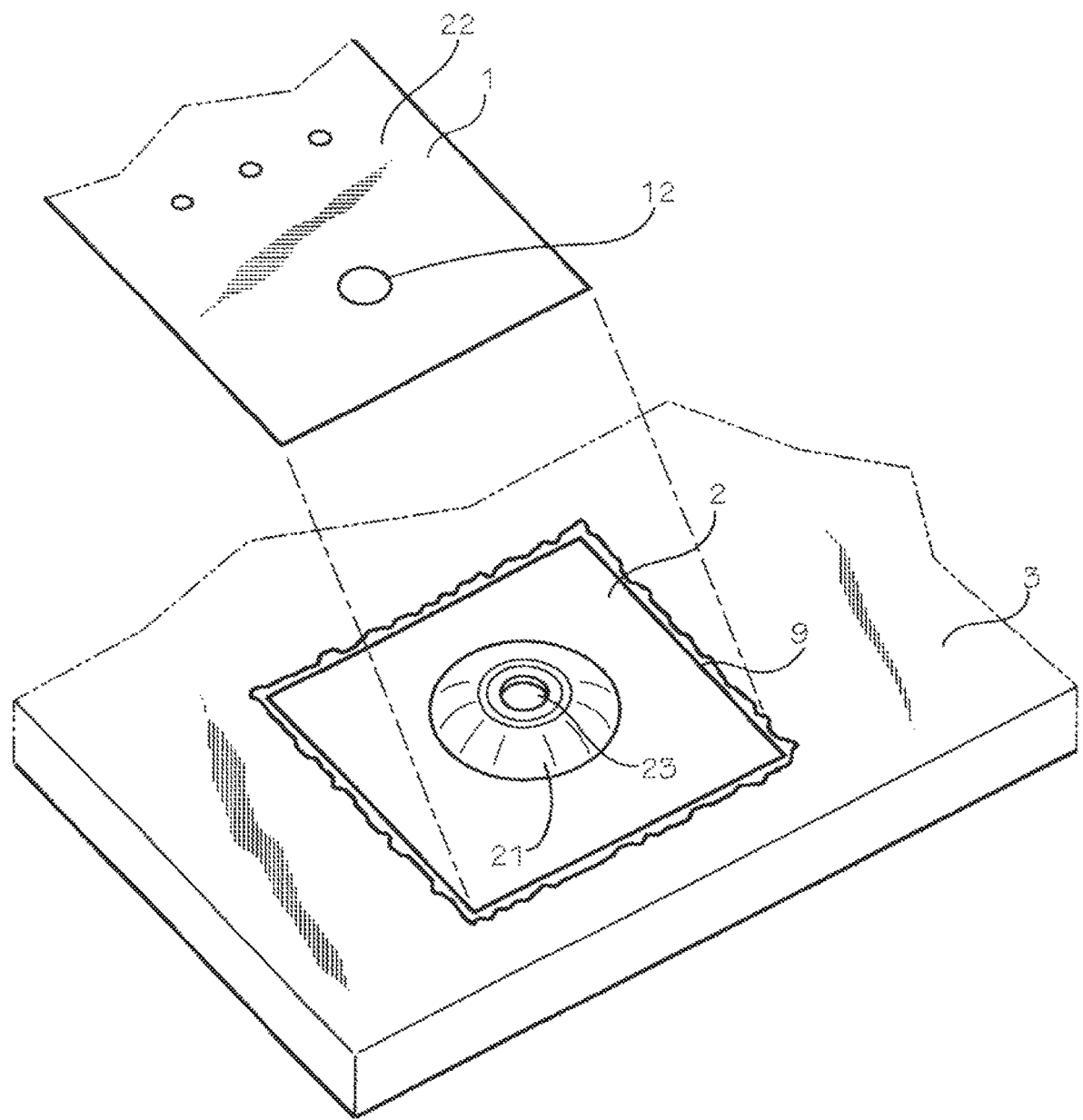
FIG. 1A illustrates a detailed bottom view of a single flexible attachment connection exploded away from a mounting baseplate attached to photovoltaic solar module.

FIG. 1A shows a detailed bottom view in which a single flexible weld harness 1 is exploded away from the mounting baseplate 2 that attaches, such as with adhesive 9, to a bottom surface of the photovoltaic solar module 3. The flexible weld harness 1 has a first portion 19 that defines an opening 12 for receiving a fastener such as a screw or bolt that engages a threaded passage 23 in the baseplate 2. The threaded passage 23 extends in a raised spacer portion 21 of the baseplate 2, such as a nut mounted therein. A second portion 22 of the flexible attachment connection 1 extends laterally as a flap to overlie and connect (by mechanically linking with a fastener, chemically connecting, heat or sonic welded, thermoset bond or attached, or adhesive) to a portion of a tufted geosynthetic ground cover 11.

Figure 2:
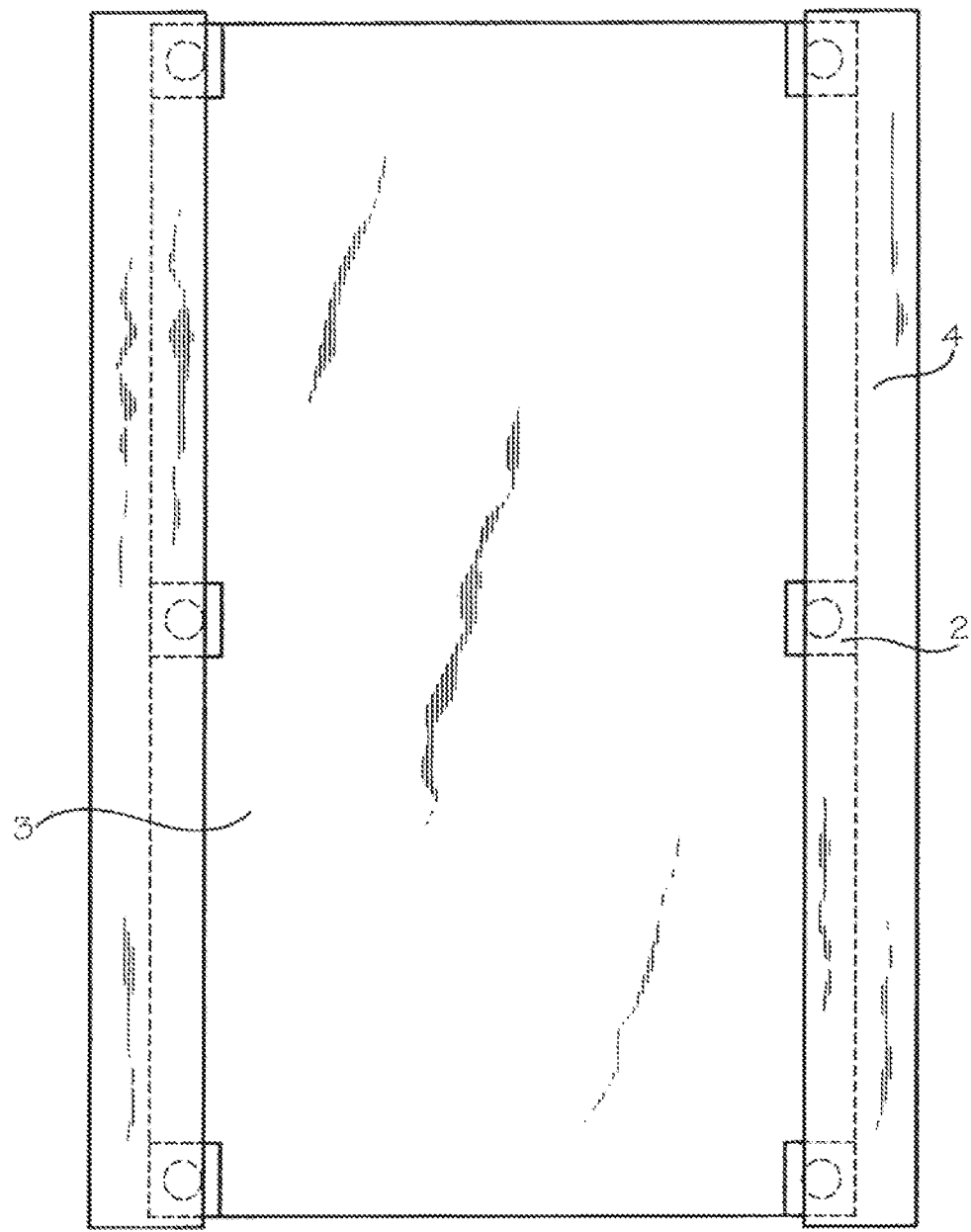
FIG. 2 illustrates a view of multiple weld harness strips mounted on a photovoltaic module.

Instead of a tab 1 for the weld harness, FIG. 2 shows multiple elongated weld harness strips 4 secured by the respective mounting baseplates 2 attached to the solar module 3.

Figure 3:
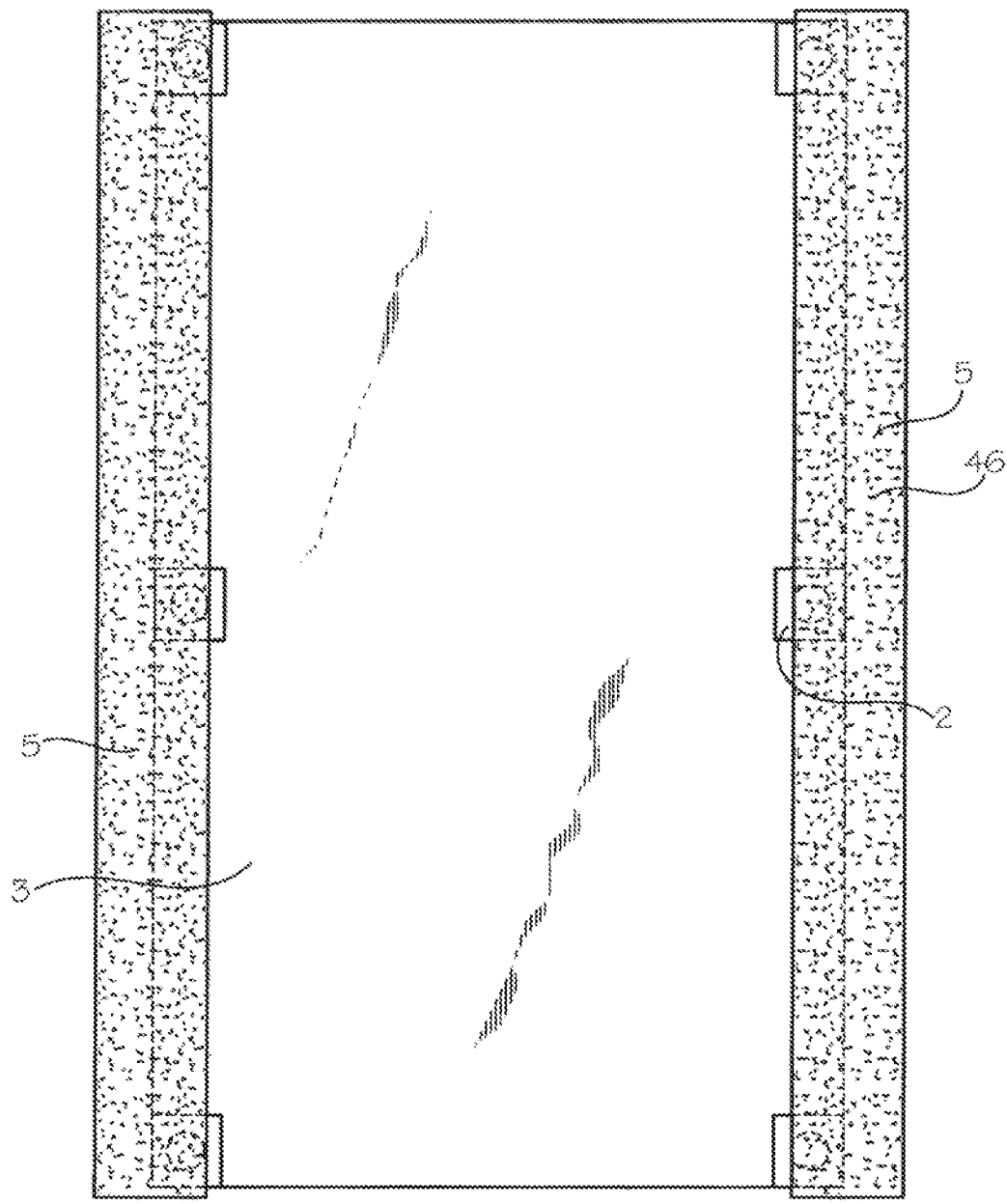
FIG. 3 illustrates a view of two anti-creep strips mounted on a photovoltaic module.

FIG. 3 shows two anti-creep strips 5 secured by the respective mounting baseplates 2 attached to solar module 3.

Figure 4:
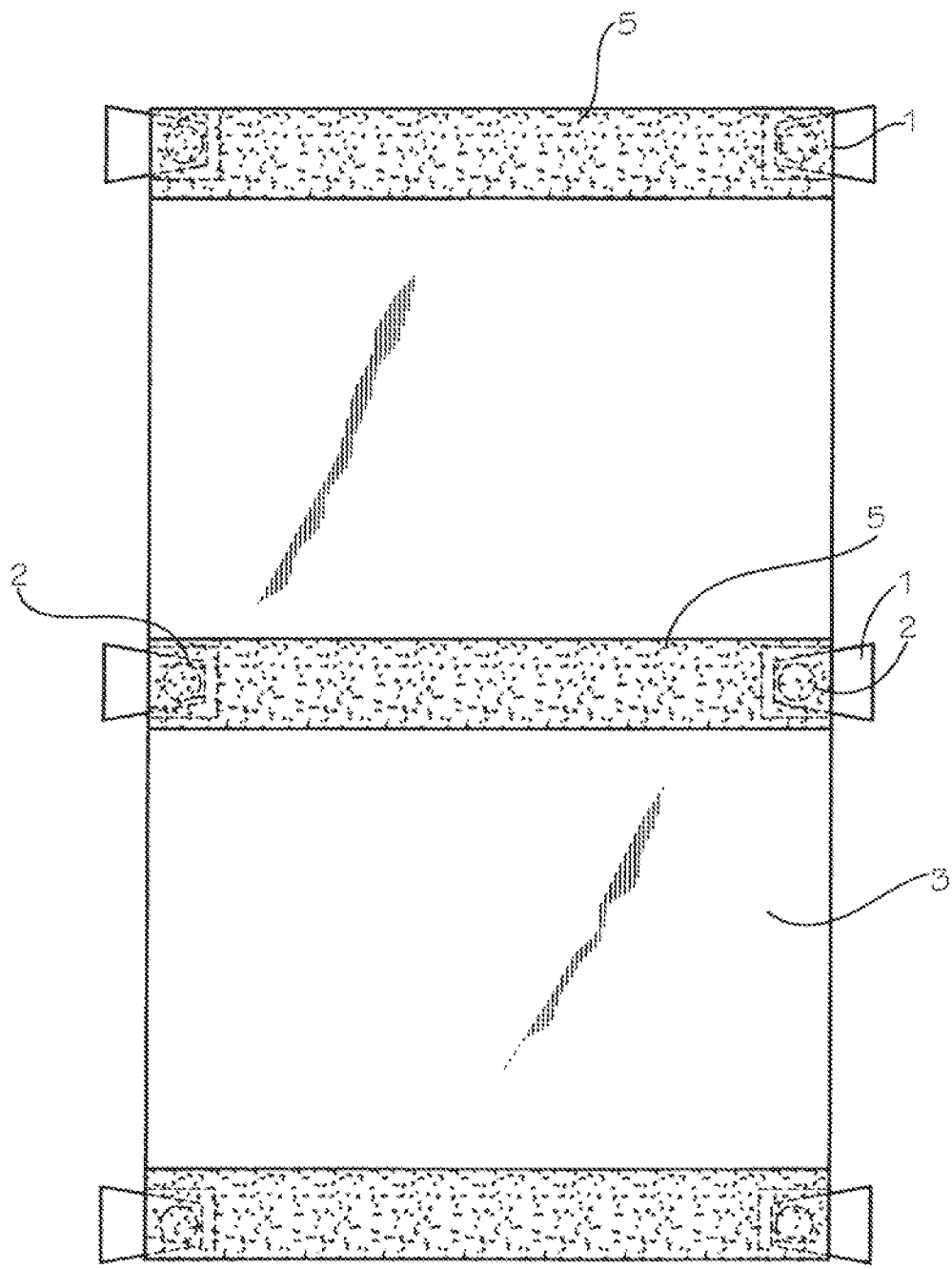
FIG. 4 illustrates a view of multiple single weld harnesses used with multiple anti-creep strips.

FIG. 4 shows multiple single weld harnesses 1 in combination with anti-creep strips 5, both secured by mounting baseplate 2 attached to solar module 3.

Figure 5A:
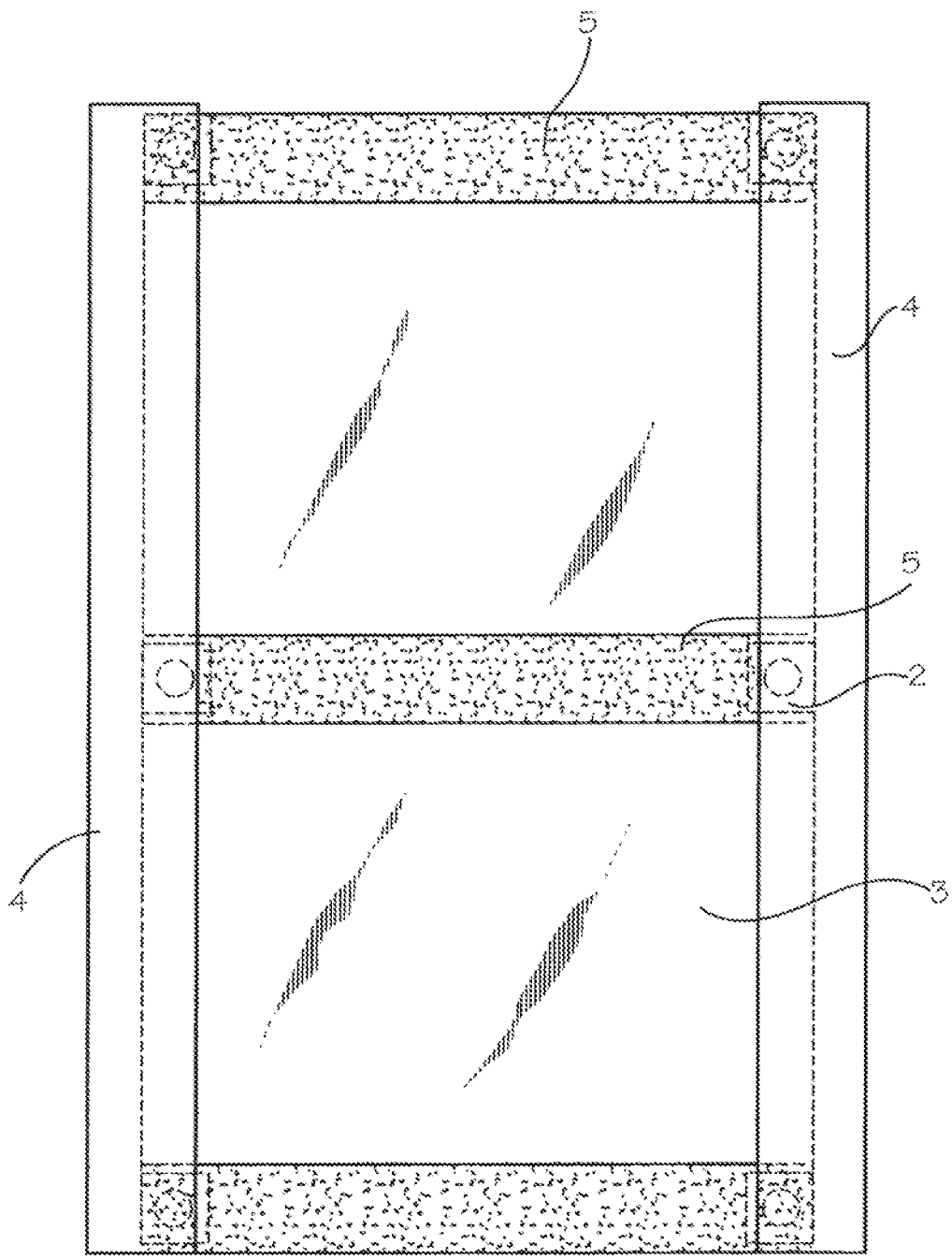
FIG. 5A illustrates a view of two weld harness strips used with multiple anti-creep strips.

FIG. 5A shows two weld harness strips 4 in combination with anti-creep strips 5 secured by mounting baseplate 2 attached to solar module 3.

Figure 5B:
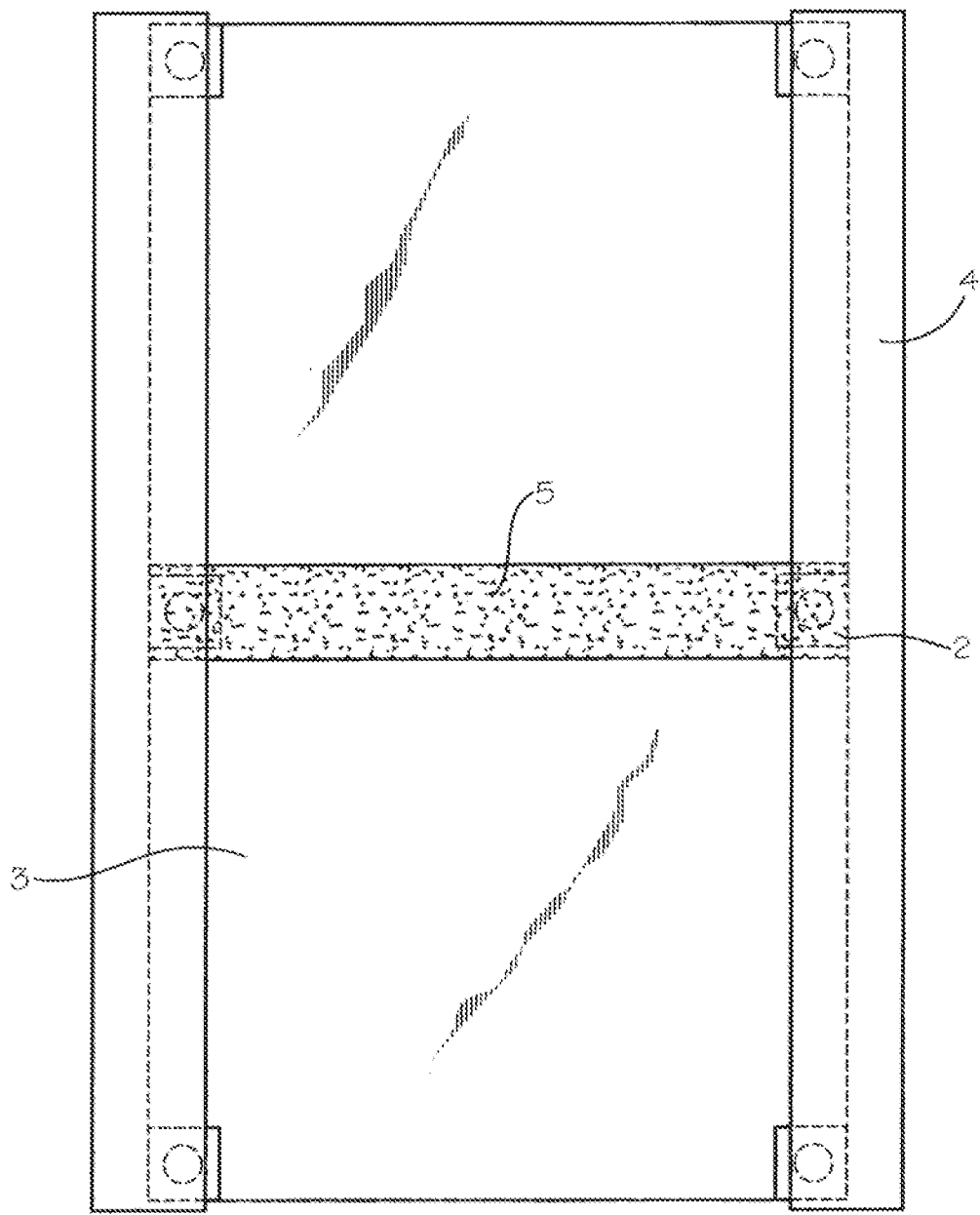
FIG. 5B illustrates two weld harness strips used with a single anti-creep strip.

FIG. 5B shows two weld harness strips 4 used with single anti-creep strip 5 secured by mounting baseplate 2 attached to solar module 3.

Figure 5C:
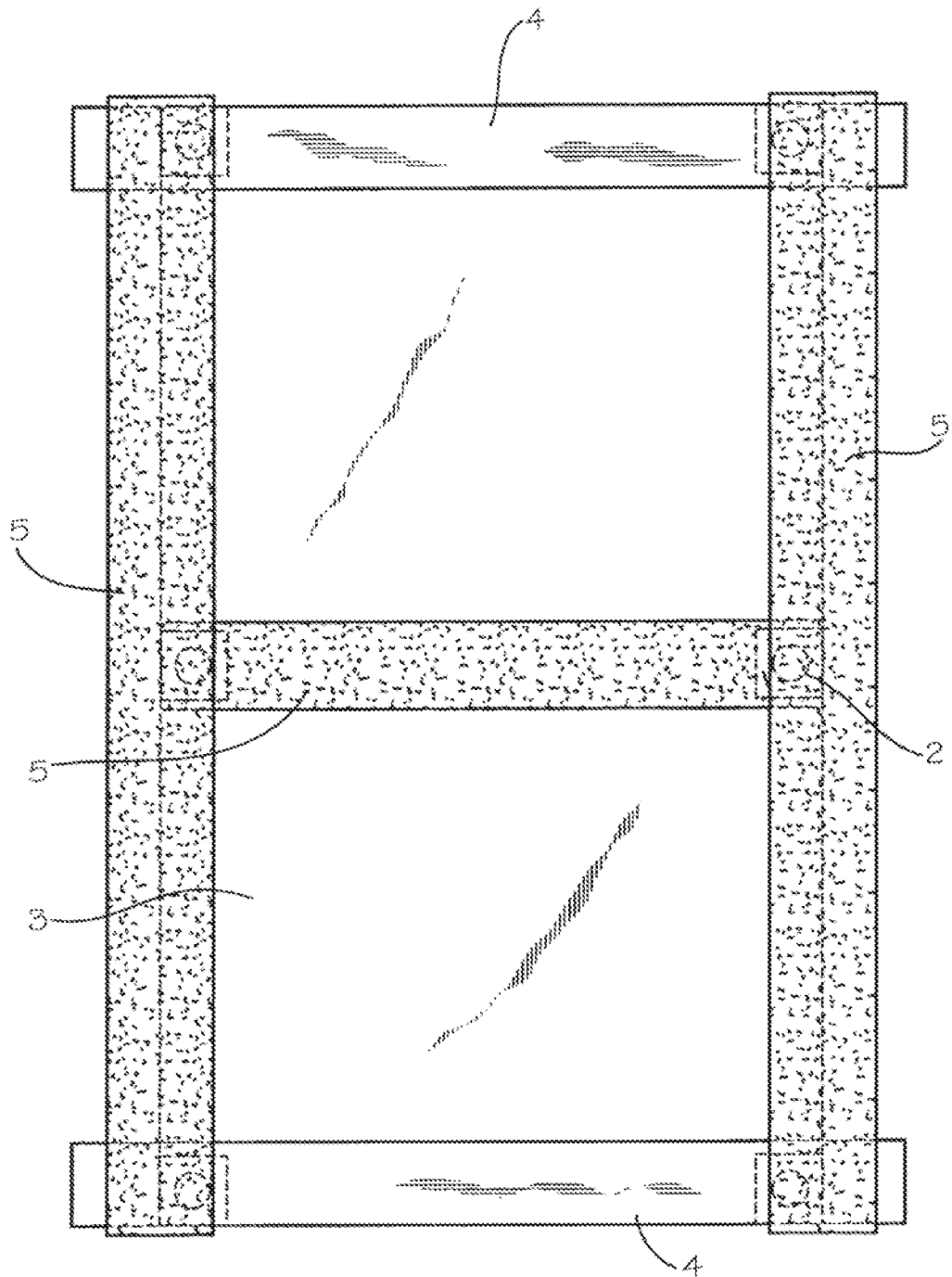
FIG. 5C illustrates two weld harness strips used with multiple anti-creep strips and multiple single weld harnesses.

FIG. 5C shows two weld harness strips 4 used with multiple anti-creep strips 5 and secured by mounting baseplate 2 attached to solar module 3.

Figure 6:
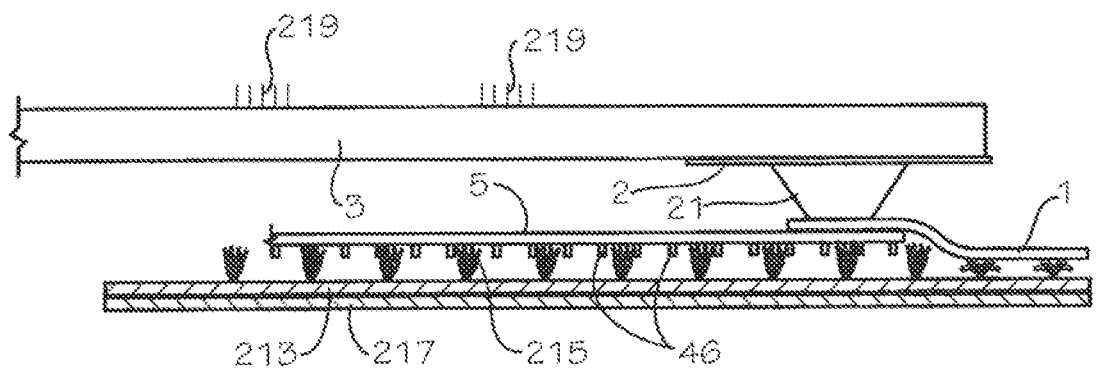
FIG. 6 illustrates a cross section of a single weld harness strip used with a photovoltaic module.

FIG. 6 shows a side elevational view of a single weld harness 1 secured to solar module 3.

Figure 6A:
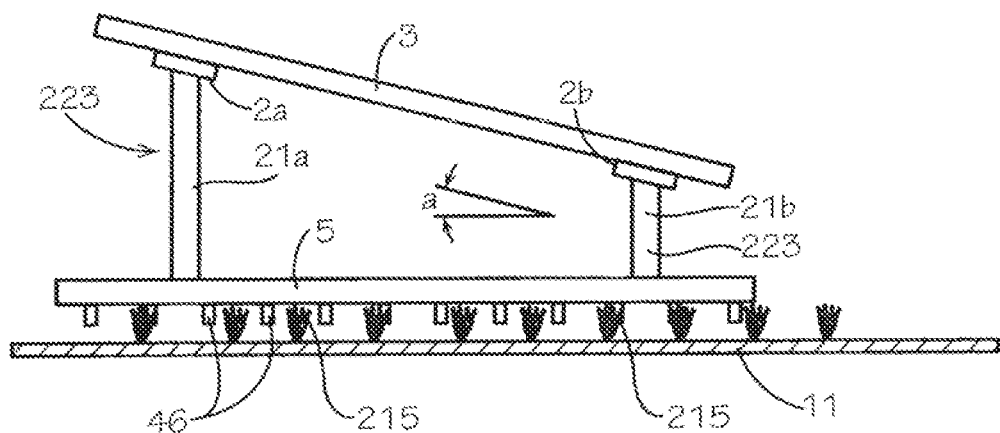
FIG. 6A illustrates in side elevational view an embodiment of the photovoltaic module mounting system using a tilting device for selective orienting at an angle to the geosynthetic for optimal positioning relative to the sun for energy generation.

FIG. 6A illustrates in side elevational view an embodiment of the photovoltaic module mounting apparatus using a tilting device generally 223 for selective orienting of the photovoltaic module 3 at an angle a to the geosynthetic cover 11 for optimal positioning relative to the sun for energy generation.

Figure 7:
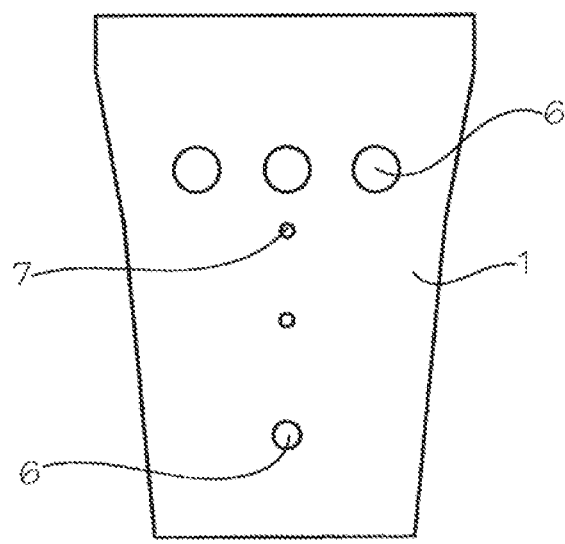
FIG. 7 illustrates a top view of a single weld harness.

FIG. 7 shows a top view of a single weld harness 1 having a single weld attachment in combination with wind disturbing openings 6 and openings 7 for attaching optional mechanical connections.

Friction

This invention also provides a method for a non-ballasted module mounting system utilizing one or more anti-creep strips 5 integrated on the photovoltaic module when mounted over tufted geosynthetics, by increasing the coefficient of friction between the anti-creep strips and the tufted geosynthetic. The anti-creep strips 5 include a plurality of spaced-apart feet 46 depending from a bottom surface. The feet 46 inter-engage with the tufts 215 to provide frictional connection of the photovoltaic solar module 3 to the tufted geosynthetic cover 11. In the illustrated embodiment, the anti-creep strips 5 connect to the mounting plate 2 using a threaded fastener to engage the threaded passageway 23 in the baseplate 2. In embodiments that uses both the anti-creep strips 5 and the weld harness 1 (or elongated attaching strip 4), the fastener extends through the anti-creep strip and the weld harness and threadably engages the passage 23. Alternatively, separate, or additional baseplates 2 may be used.

The anti-creep strips footing is generally a structured geomembrane or tufted geosynthetic cover 11.

The anti-creep strips, when used in this invention, comprise a polymeric material such as polyethylene, polypropylene, ethylene propylene diene monomer, rubber, metal, textured metal, polyvinyl chloride, polyurethane, etc.

Further, an alternate embodiment may charge the geosynthetic cover 11 with ballast infill 221, to provide a mass that increases the frictional resistance to movement with the plurality of particles of the infill that fill interstices and spaces above the geotextile 213 and among the tufts 215. When used in this invention, suitable materials for infill are sand, concrete and materials available from Watershed Geosynthetics LLC (Alpharetta, GA) under the trademarks HydroBinder and ArmorFill. Infill can be of various colors, sizes and textures.

When used in this invention, examples of suitable materials for anti-creep strips are calendared, textured and structural membranes made by Agru America, Inc. under the trademark SureGripnet.

Wind Uplift Resistance

The present invention comprises a wind-resistant non-ballasted integrated photovoltaic module mounting system for use on a tufted geosynthetic, which preferably includes both anti-creep strips and an attachment layer. The system does not rely on weight to resist wind forces, but instead relies on wind-breaking turf blades (i.e., the synthetic grass) and an attachment to the turf blades (synthetic grass). The cover of the present invention can be deployed over a large area with very minor ballasting. Wind-breaking elements 219 may also be utilized to break up the airflow over the integrated photovoltaic module to provide wind uplift resistance. As illustrated in FIG. 6, one or more wind breaking elements generally 219 may attach to an edge of the photovoltaic module 3. The wind breaking elements 219 comprise a plurality of thin spaced-apart pins that extend upwardly, for example, about 1-12 inches, preferably about 2-6 inches, and more preferably, about 2-3 inches. In an alternate embodiment, the weld harness 4 may include wind breaking or disturbing openings 6.

With this invention, the wind velocity on the impermeable surface (geo-membrane) becomes turbulent near the surface of the cover, thus greatly reducing the actual wind velocity at the liner surface and decreasing associated uplift. The reaction of the synthetic grass of the tufted geosynthetic to the wind forces can also create a downward force on the geomembrane. This reaction is caused by the filaments of the synthetic grass applying an opposing force against the wind which is transferred as a downward force on the geomembrane.

The integrated photovoltaic module of this invention can be used with an optional tilting device to raise or lower the module for better results depending on the location. FIG. 6A illustrates in side elevational view an embodiment of the photovoltaic module mounting apparatus using the tilting device generally 223 for selective orienting of the photovoltaic module 3 at an oblique angle a relative to the geosynthetic cover 11 for optimal positioning relative to the sun for energy generation. The tilting device 223 comprises at least a pair of the mounting base plates 2a, 2b having riser portions 21a, 21b of different lengths, whereby the photovoltaic module 3 is disposed at the angle a to the geosynthetic cover 11, for optimal energy generation.

Further, the mounting baseplate 2 spaces the photovoltaic solar module 3 from the tufted geosynthetic ground cover 11. The spacing thereby creates a gap between the tufted geosynthetic ground cover and the photovoltaic solar module 3, which gap facilitates air flow therealong for heat dissipation in that heating of the photovoltaic solar module 3 which occurs reduces the solar generation efficiency of the solar module. In an alternate embodiment, the mounting base plate 2 is sized to provide at least an 18 inch to 24 inch gap under the photovoltaic solar module 3. To further enhance solar generation energy capacity, the photovoltaic solar module 3 is bifacial and the tufted geosynthetic ground cover 11 includes light reflective features, such reflectants added into the polymeric used the extrusion of the yarn from which the tufts 215 are formed during tufting. As shown in FIG. 1, tuft 215a illustrates a reflectant 216, for example, a small light-reflecting body or chip. Further, a light reflective color pigment material may be included in the polymeric to enhance reflectivity of ambient light from the tufted geosynthetic ground cover 11 proximate the photovoltaic solar module 3. For example, tufts 215b are tufted with yarns that include a coloring pigment 218.

Figure 8:
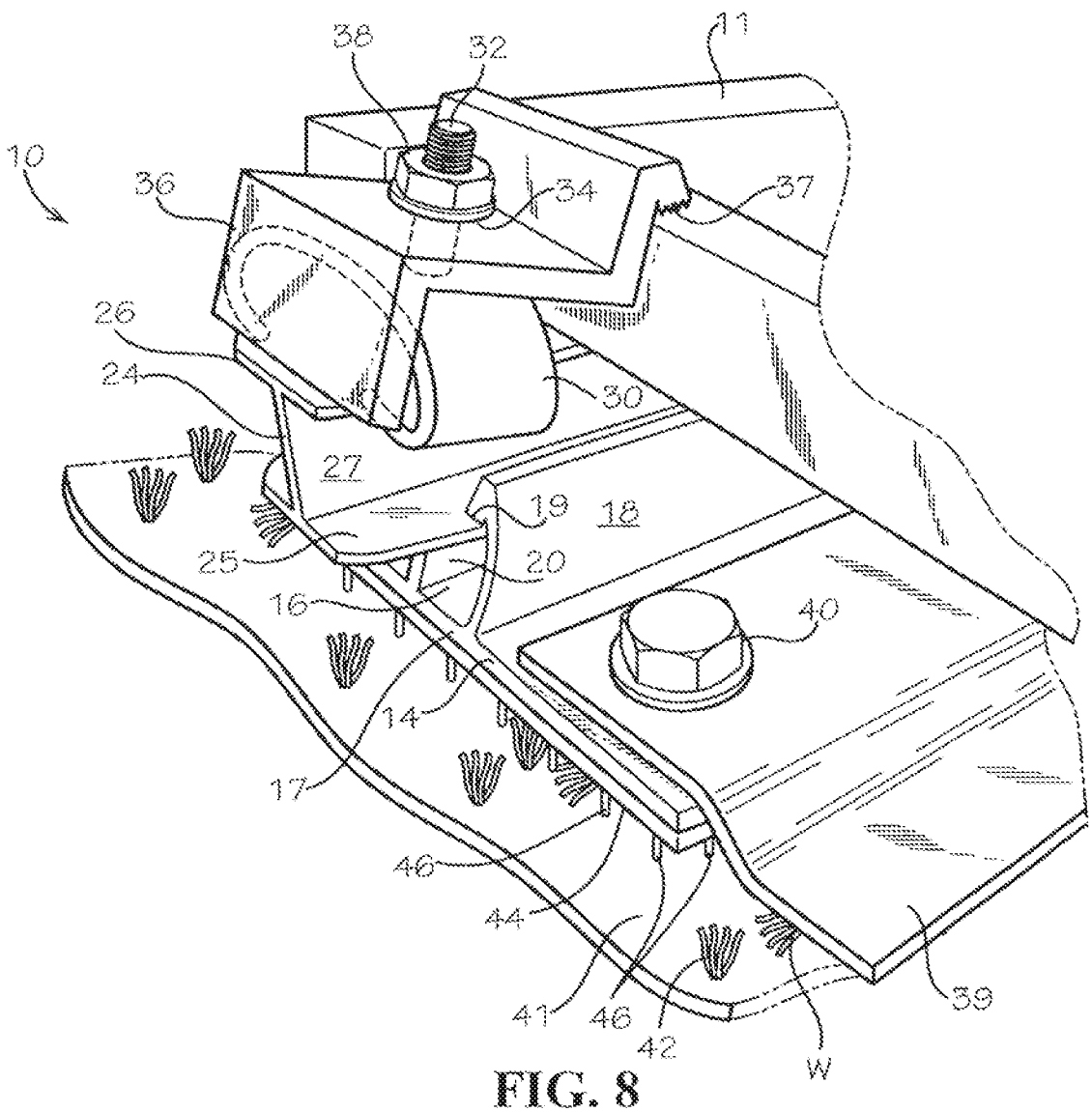
FIG. 8 illustrates a perspective view of the mounting system in another preferred form.

With reference next to FIG. 8, there is a shown a mounting system 10 in another preferred form of the invention. The system 10 is shown mounted to a double glass photovoltaic module or solar panel 11. The system 10 includes an elongated base plate 14 having an elongated mounting channel 16 defined by a generally planar, elongated base member 17, two oppositely disposed elongated, vertically oriented channel walls 18 having inwardly extending clamping tangs 19, and an elongated, vertically oriented central support wall 20. The system also includes an elongated I-beam or rail 24 having a horizontal lower member 25, a horizontal upper member 26 and a vertical spanning member 27 extending between the lower member 25 and upper member 26. The I-beam 24 is selectively, releasably coupled to and slideable relative to the underlying base member 17 for slideable movement therebetween through a force placed upon the I-beam 24. The clamping tangs 19 of the channel walls 18 abut the top surface of the lower member 25 while the lower member rests upon the central support wall 20, thereby holding the I-beam 24 in place relative to the base plate 14.

A C-shaped bracket 30 is slidably coupled to the upper member 26 for selective longitudinal movement along the upper member 26. The C-shaped bracket 30 includes a threaded mounting post or bolt 32 extending upwardly and through a mounting hole 34 within a staggered clamp 36. The staggered clamp 36 includes a contact ledge 37. A nut 38 is threadably coupled to the mounting post 32 to force the contact ledge 37 of the staggered clamp 36 downwardly against the peripheral margin of the solar panel 11, thus locking the position of the solar panel 11. The tightening of the nut 38 upon the post 32 also causes the staggered clamp 36 to be forced downward into abutment with the upper member 26 of the I-beam, thereby locking the position of the C-shaped bracket 30 and staggered clamp 36 relative to the I-beam 24. The base plate 14, I-beam 24, bracket 30, and clamp 36 may all be made of a polymer or metal material, such as aluminum.

Lastly, the mounting system 10 includes a weld harness or weld harness strip 39 and anti-creep strips 44 which are coupled to the base member 17 through bolts 40. As with all embodiments herein, the anti-creep strips 44 include a generally planar support 45 and an array or arrangement of downwardly extending feet or projections 46. The anti-creep strip 44 may be made of a polymer material or the like. The weld harness strip 39 has a first portion 39' which is coupled to the base plate 14, and a second portion 39" which is meltable to the underlying tufted geosynthetic 41.

In use, the weld harness strip 39 overlays a portion of the tufted geosynthetics 41 wherein heat, or other form of welding, is applied to the weld harness strip 39 so that the weld harness strip 39 partially melts or becomes molten and thereby bonds or coupled with the strands or yarns 42 of the geosynthetic material when cooled. The bonding of the weld harness strip 39 to the yarns is depicted by welding reference W.

It should be understood that the geosynthetic material may be used in combination with one or more layers of additional geosynthetic materials.

Figure 9:
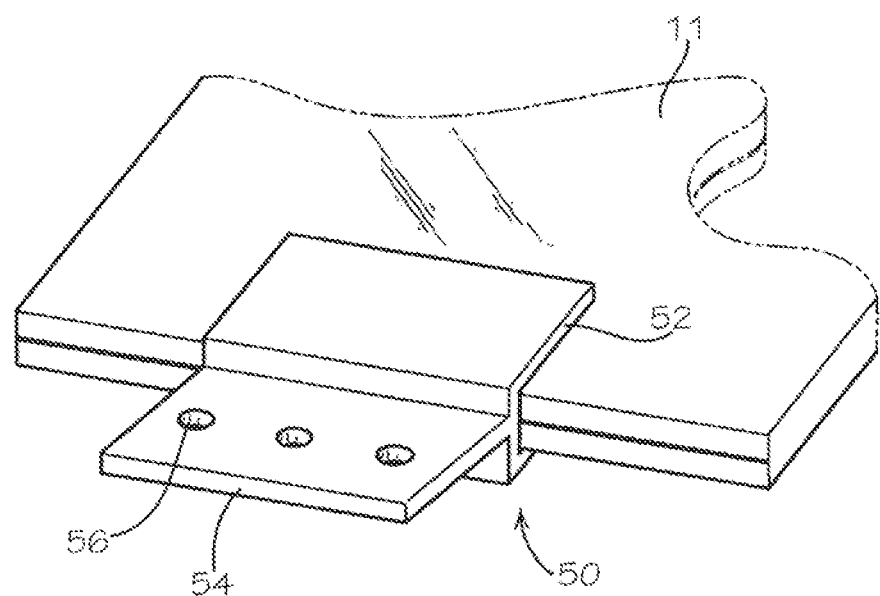
FIG. 9 illustrates a perspective view of the mounting system in another preferred form.
Figure 10:
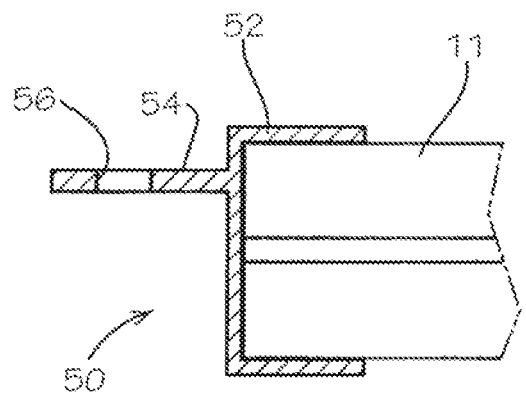
FIG. 10 illustrates a side view of a portion of the mounting system of FIG. 9.

With reference next to FIGS. 9 and 10, there is shown a portion of a double glass solar panel 11 with a side edge mounting bracket 50. Here, the side edge mounting bracket 50 has a U-shaped member 52 and a mounting flange 54 extending laterally and horizontally from the U-shaped member 52. The mounting flange 54 includes one or more mounting holes 56. The member 52 grips a side portion of the solar panel 11, and may be secured thereto with fasteners or adhesive.

The side edge mounting bracket 50 may be coupled to mechanical means shown in FIG. 8. Specifically, the side edge mounting bracket 50 may be coupled to the C-shaped bracket 30 with the mounting post 32 extending through one of the mounting holes 56 of the mounting flange 54 and secured thereto with a mounting nut 38. As with the embodiment of FIG. 8, the C-shaped bracket 30 is coupled to the I-beam 24 which in turn is coupled to the base plate 14. The welding harness strip 39 and anti-creep strip 44 are also utilized to prevent relative movement with respect to the geosynthetic material to which the welding harness strip is mounted. Again, the welding harness strip may be mounted through heat welding, ultrasonic welding, adhesive, or mechanical means such as a nut and bolt. However, heat or ultrasonic welding is preferred as it provides a superior bond between the yarn of the preferred tufted geosynthetic material.

Figure 11:
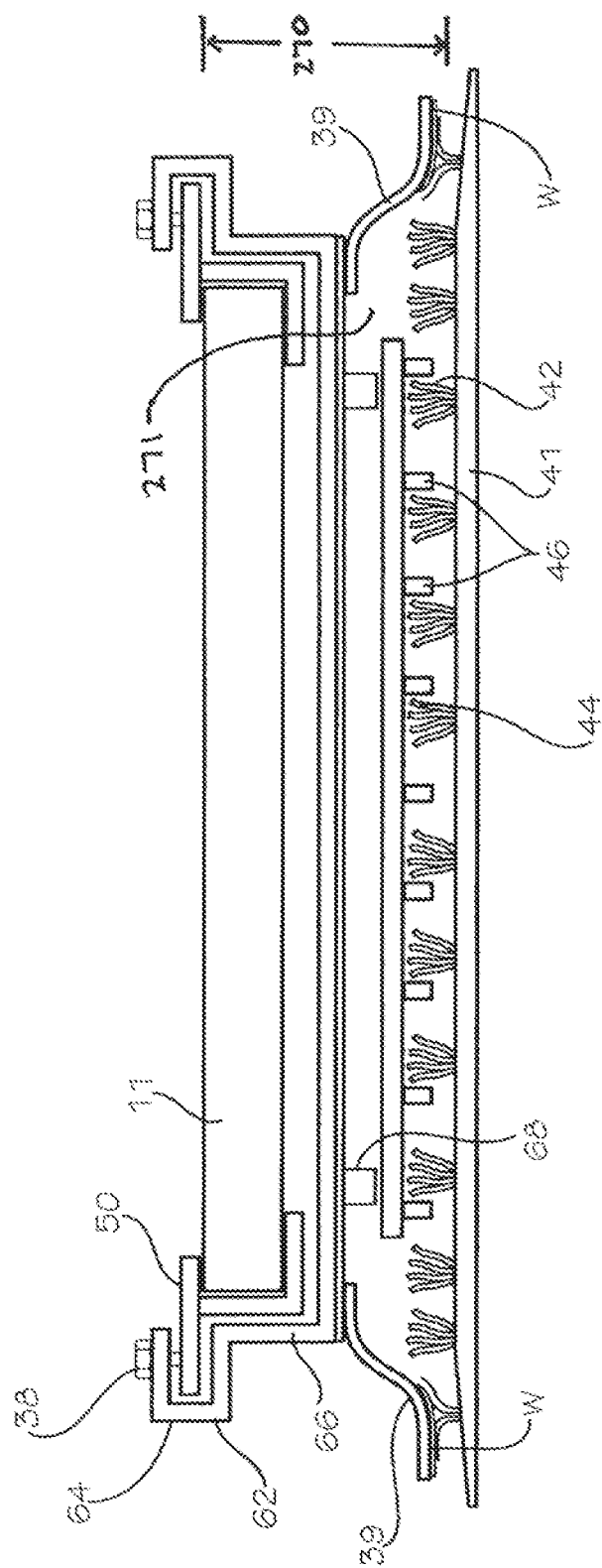
FIG. 11 illustrates a side view of the mounting system in another preferred form.
Figure 12:
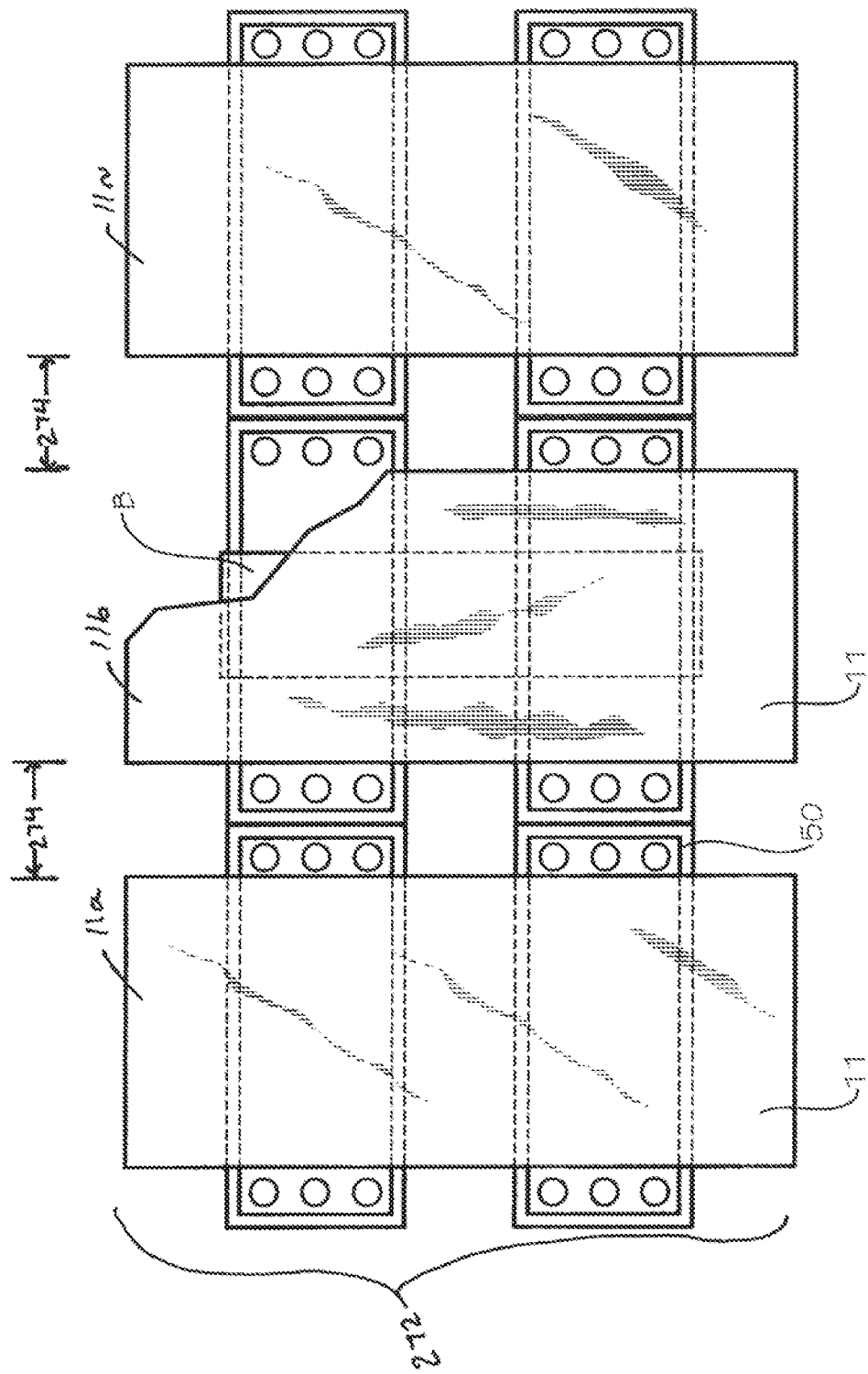
FIG. 12 illustrates a top view of the mounting system of FIG. 11, shown with multiple solar panels mounted together.

With reference next to FIGS. 11 and 12, there is shown a solar panel 11 and mounting system 60 in another preferred form of the invention. Here, the mounting system 60 includes a side edge mounting bracket 50 similar to that shown in FIGS. 9 and 10. However, the mounting system 60 includes a mounting rail or attachment 62 which essentially replaces the C-shaped bracket 30, I-beam 24 and base plate 14 of the previous embodiments. The mounting bracket 50 is captured within a channel 63 within the mounting attachment 62 so as to be selectively releasably coupled to and slideable relative to the mounting attachment 62. The mounting attachment 62 may be made of any suitable material, such as a metal or polymer.

Here, the mounting attachment 62 includes a top portion 64 which captures the mounting flange 54 of the side edge mounting bracket 50 extendingly attached to the solar panel 11 and is affixed thereto and secured in position through a threaded mounting bolt 38. Optionally, the mounting attachment 62 may be made of a polymer material which allows it to flex, thereby allowing for the solar panel to be snap fitted into the top portion 64 without the need for the use of the mounting post and nut to secure the position of the solar panel 11 to the mounting attachment 62. The top portion 64 extends to and merges with a lower portion or cradle 66 which extends about the side and bottom of the mounting bracket 50. The lower portion 66 may be considered to be an elongated base plate or base portion and is integrally coupled with or extending from the mounting attachment 62. The lower portion 66 includes feet 68 to which the anti-creep strip 44 is coupled through conventional means, such as bolts, screws, or adhesive. The lower portion 66 also includes weld harness strips 39 which are welded W or otherwise coupled to the tufted geosynthetic material, and specifically the yarns of the tufted geosynthetic material, as previously discussed.

The lowest part of lower portion 66 may be considered to be a base plate as it forms the base of the lower portion 66. Therefore, the highest part of lower portion 66, which forms the C-shaped channel about bracket 50, may be considered to be an elongated rail which is integrally formed with or extends from the portion considered to be the base plate.

With this configuration, ballast B, such as elongated weight members, may be easily coupled to the mounting attachment 62 if desired, as shown in FIG. 12.

Array of Interconnected Spaced Solar Photovoltaic Modules

Multiple mounting attachments may be mounted end to end, as shown in FIG. 12, to form a compart series of solar panels 11 and mounting systems 10. In accordance with the present invention, the plurality of solar panels 11 being interconnected form an array 272 of solar panels 11 that upon being disposed relative to a surface resists wind uplift while generating electricity.

As shown in FIG. 11, the solar panels 11 are disposed on the supporting mounting systems disclosed herein at a distance 270 from the surface (in the illustrated embodiment, from the tufted geosynthetic 41). This defines a gap 271, or airspace, between the solar panel 11 and the geosynthetic 41. The airspace 271 receives air flow which helps dissipate heat from the solar panel 11 during generation of electricity. Further, as shown in FIG. 12, the plurality of solar panels 11 are positioned in the array 272 as a row of modules in adjacent relation and spaced-apart a distance 274 such that a second solar panel 11b is spaced the distance 274 from a side of a first solar panel 11a.

Figure 22:
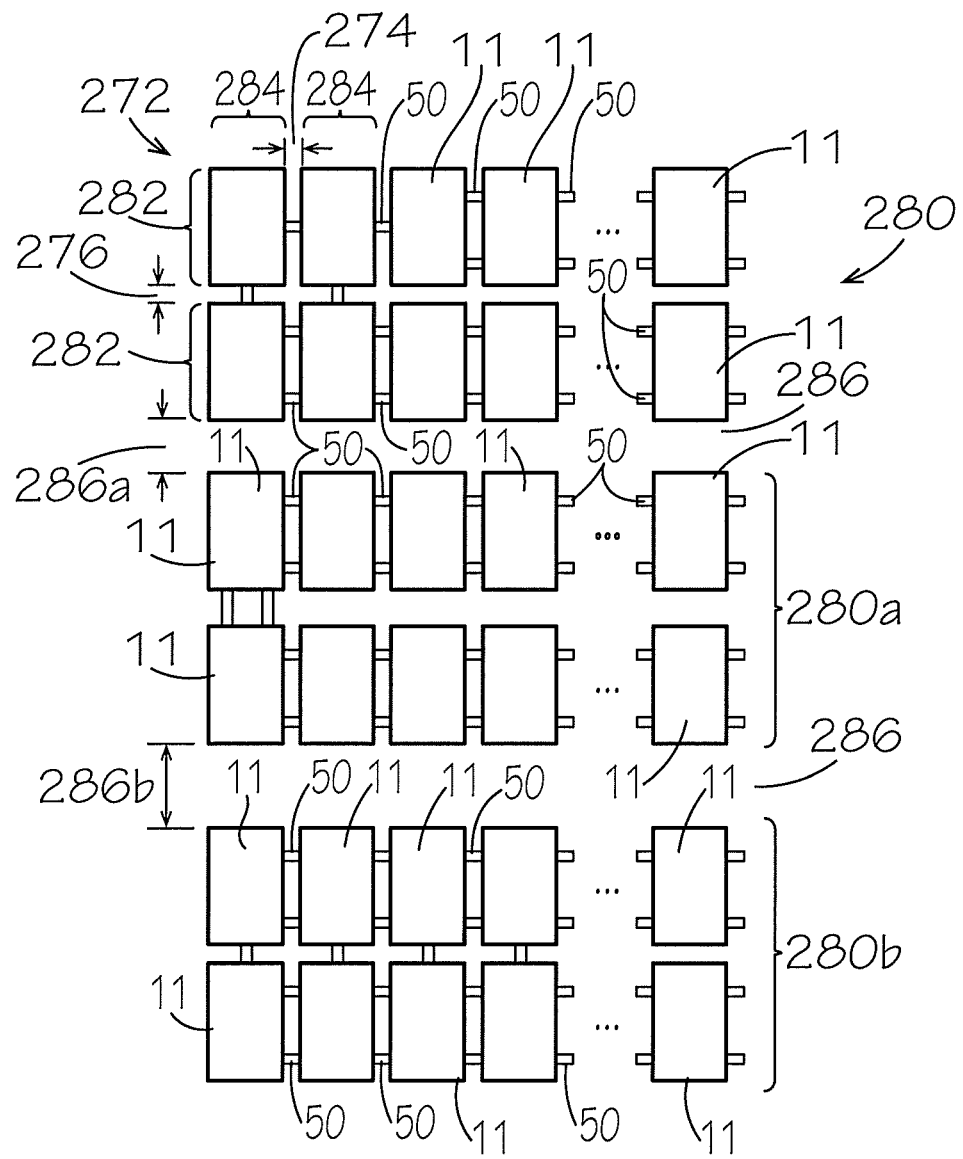
FIG. 22 illustrates in plan view a field of solar photovoltaic modules interconnected in spaced-apart for generating electricity while resisting wind uplift.

FIG. 22 illustrates a field having an array 280 of solar photovoltaic modules (or solar panels 11) interconnected in spaced-apart relation (illustrated generally as rows 282 and columns 284) for generating electricity while resisting wind uplift spaced apart 270 (see FIG. 11) from the tufted geosynthetic 41 (or in alternate embodiments, from a ground surface). The solar photovoltaic modules 11 mount on supports spaced 270 from the surface to define the airspace gap 271 underneath the solar panel 11. The airflow through the airspace 271 dissipates heat arising from the solar panel 11 while generating electricity. The adjacent solar photovoltaic modules 11 in a respective row 282 are spaced apart the first distance 274. Adjacent rows of the solar photovoltaic modules 11 are spaced apart a second distance 276. Connectors attach to and connect adjacent solar photovoltaic modules together side-by-side in a row and in adjacent rows. The array 280 thereby include air gaps 278 between the solar photovoltaic modules 11, which allows air to flow from underneath the modules so that the modules connected together resist wind uplift.

Further, the field on which the array 280 is placed may include a second array 280a of solar photovoltaic modules 11 disposed as described above in spaced-apart rows 282 and columns 284. The first array 280 is spaced from the second array 280a with an array gap 286a to define a worker passage therebetween. Alternatively, the array gap 286a may define a vehicle passageway 286b, in which the array gap 286b is greater than the array gap 286a for a passage for vehicles to be driven through the field of solar photovoltaic module arrays, for example, for bringing equipment for installation or servicing purposes. FIG. 22 illustrates the field with three arrays 280, 280a and 280b, spaced with array gaps 286 for worker passage (286a) and for vehicle passage (286b) through the arrays.

The modules 11 are spaced-apart in the array 280 as discussed above. The first distance 274 is about 1 inch to about 12 inches and the second distance 276 is about 1 inch to about 12 inches. The solar modules 11 are supported a vertical distance of about 1 inch to about 24 inches. Preferably, the solar modules 11 are supported about 9 inches above the tufted geosynthetic 41. The array gap 286a between a first and second array 280, 280a for the worker passage is between about 12 inches and 48 inches, and provides access for servicing of the modules 11 in the respective array (such as walking beside the modules or standing/sitting proximate a module for servicing). In the alternate embodiment, the array gap 286b is a distance of between about 4 feet and 10 feet, for accommodating passage of a service vehicle in the worker passage, such as a truck or small wheeled service vehicle carrying replacement panels or parts into the solar array for servicing services.

The solar photovoltaic modules 11 in the array are disposed with a solar sensitive face generally parallel to the surface 41. The solar photovoltaic modules thus disposed are positioned for maximizing available generating capacity while sacrificing efficiency that is based on an angled orientation of the modules relative to the sun.

Figure 23:
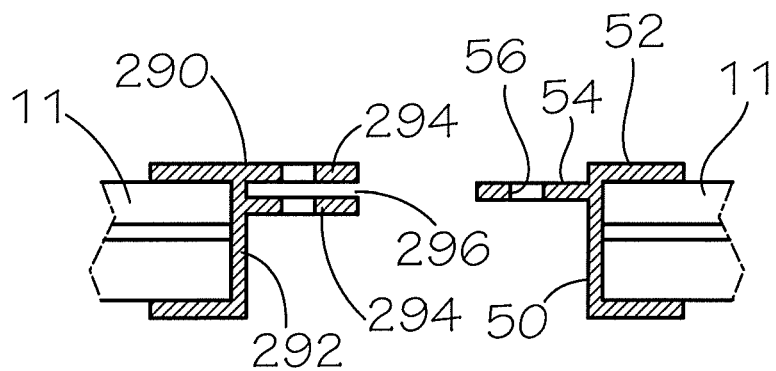
FIG. 23 illustrates in side view an alternate embodiment of a connector for connecting adjacent solar photovoltaic modules in an array.

FIG. 10 illustrates the connector 50 that attaches to the solar panel 11. The connector comprises at least one flange 54 extending laterally from the module 11. The flange 54 defines the opening 56 that receives a fastener. The flange 54 overlaps the flange of the adjacent solar photovoltaic module, and the fastener secures the two modules together. In one embodiment, the module comprises a U-channel frame from which the flange 54 extends. In another embodiment, the connector comprises a U-shaped member having a base and a pair of spaced-part plates. The base abuts a side edge of the solar photovoltaic module and the plates attach in overlying relation to opposing planar surfaces of the solar photovoltaic module. The flange extends laterally from the base. In yet another alternate embodiment illustrated in FIG. 23, the connector comprises a receiver-defining member 290 attached to a first side of the solar photovoltaic module 11 and the flange 54 extending laterally from an opposing side of the module. The receiver-defining member 290 comprises at least a U-shaped member having a base 292 and a pair of spaced-apart plates 294 that each define an opening. The base 292 attaches to the first side of the solar photovoltaic module. The plates 294 extend laterally and define a receiver space 296 therebetween. The flange 54 extending from the second side of the adjacent solar photovoltaic module aligns with the receiver-defining member 290. The receiver space 296 receives the flange 54. The fastener extends through aligned openings in the plates 294 and the flange 54 to connect the adjacent modules.

Succinctly, the array 289 provides the plurality of solar photovoltaic modules 11 for generating electricity, with the first solar photovoltaic module 11 mounted on the surface 41 and the second solar photovoltaic module 11a mounted laterally adjacent a first side of the first solar photovoltaic module and spaced the first distance 274 apart with at least one connector 50 connecting the first and second solar photovoltaic modules together. Alternatively, a third solar photovoltaic module 11*c* mounts on the surface adjacent a second side of the first solar photovoltaic module spaced the second distance 276 therefrom with at least one connector 50 connecting the first and third solar photovoltaic modules together. The respective solar photovoltaic modules disposed at the third distance from the surface 41 and being interconnected define the array that resists wind uplift while generating electricity. Further, the second electricity generating array 280*a* is spaced such that a solar photovoltaic module of the first array is spaced the fourth distance (the array gap 286) from the first solar photovoltaic module of the second array for a worker, or selectively a vehicle, passage between the first and second arrays.

An application of the invention arranges the plurality of solar photovoltaic modules in one or more arrays for generating electricity, by (a) positioning a first solar photovoltaic module on a surface; (b) disposing a second solar photovoltaic module laterally adjacent a first side of the first solar photovoltaic module and spaced a first distance therefrom with at least one connector connecting the first and second solar photovoltaic modules together; and (c) disposing a third solar photovoltaic module adjacent a second side of the first solar photovoltaic module and spaced a second distance therefrom with at least one connector connecting the first and third solar photovoltaic modules together. The respective solar photovoltaic modules supported at a third distance from the surface and being interconnected define the array that resists wind uplift while generating electricity. Further, the application may install a second electricity generating array in the field. The second array is positioned such that the third solar photovoltaic module of the first array is spaced a fourth distance from the first solar photovoltaic module of the second array for a worker passage between the first and second arrays. Further, the application may install a third array of solar photovoltaic modules disposed such that the third solar photovoltaic module of the second array is spaced a fifth distance from the first solar photovoltaic module of the third array, the fifth distance greater than the second distance for a vehicle passage between the second and third arrays.

Figure 24:
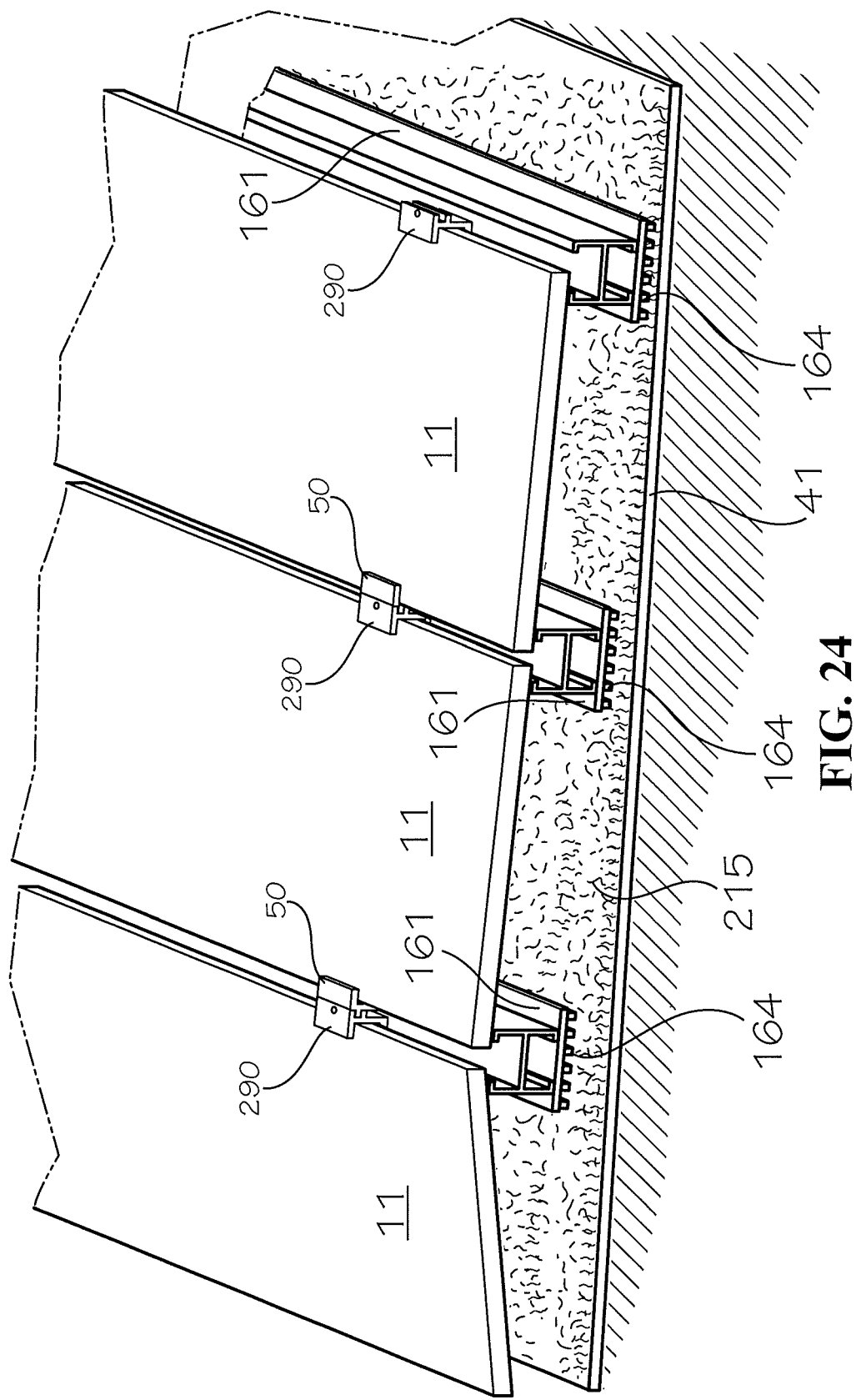
FIG. 24 illustrates a perspective view of a portion an array of highly densely spaced solar photovoltaic modules for generating electricity.

FIG. 24 illustrates a perspective view of a portion the array 280 of highly densely spaced solar photovoltaic modules 11 for generating electricity. The solar photovoltaic modules 11 mount to rails 251 spaced-apart on the tufted geosynthetic ground cover 41 with feet 164 of the anti-creep strip frictionally engaged to the tufts 215. Brackets 290, 50 matingly connect adjacent solar photovoltaic modules 11.

Figure 25:
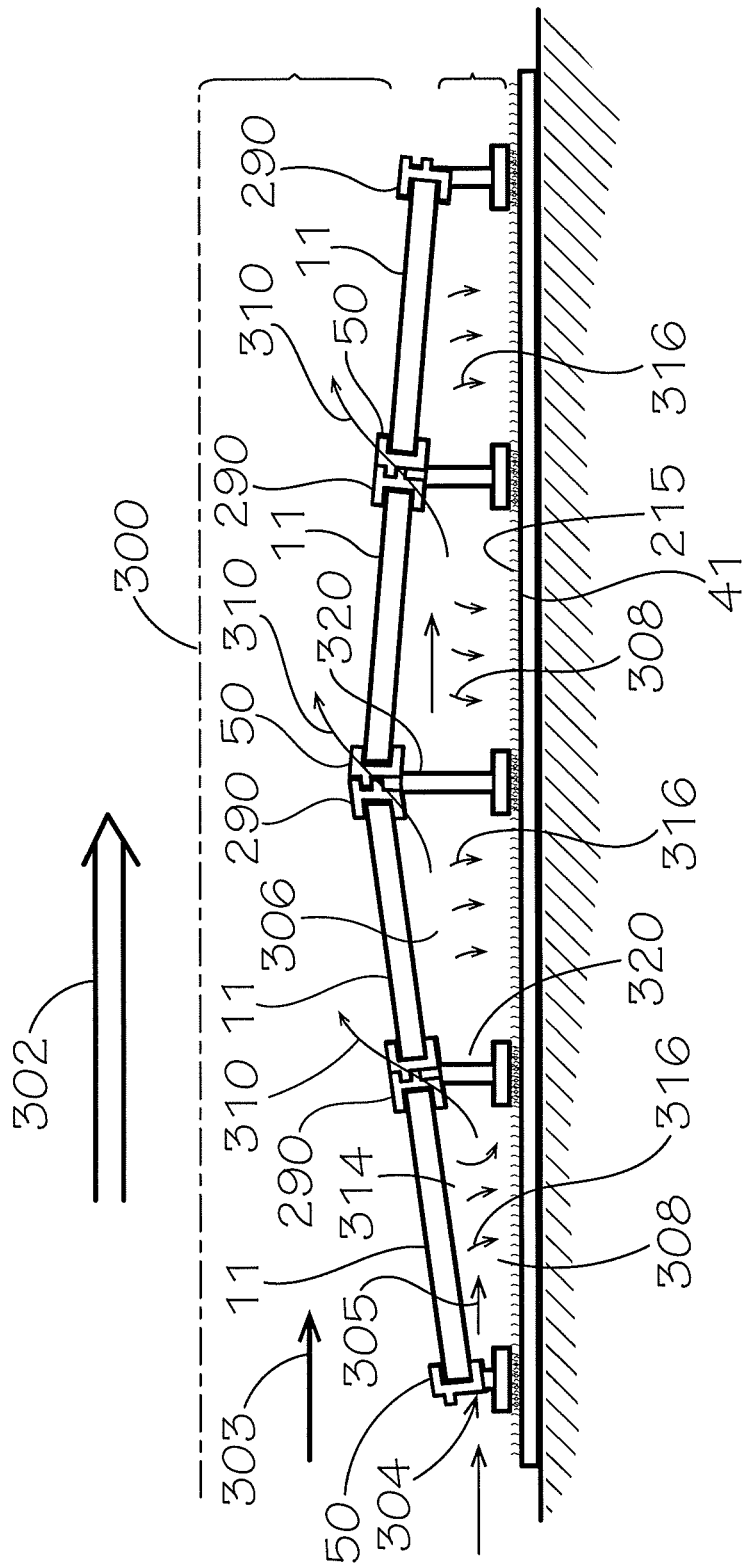
FIG. 25 illustrates wind flow relative to an array of highly densely spaced solar photovoltaic modules mounted to a tufted geosynthetic ground cover for a land area for generating electricity.

FIG. 25 illustrates wind flow relative to the array 280 of highly densely spaced solar photovoltaic modules mounted to a tufted geosynthetic ground cover for a land area for generating electricity. The spaced modules 11 mount in close proximity to the tufted geosynthetic below a boundary layer 300 of air flow 302 over the array 280. The wind flows over 303 and below 305 the photovoltaic modules 11. The wind flow 305 under the photovoltaic modules 11 enters, for example, through a gap 304 between a side edge of the array 280 and the tufted geosynthetic ground cover 41. The wind flow 305 underneath the solar photovoltaic modules 11 flows through a space 306 between the solar photovoltaic module and the tufted surface of the geosynthetic 41. The tufts 215 of the tufted geosynthetic ground cover 41 creates micro-eddy turbulence 308 of the wind flow 305 in and around the tufted geosynthetic 41. The micro-eddy turbulence 308 forms a localized swirling 314 of the wind flow and a reverse current 316 from the turbulent wind flow. The movement of the wind flow essentially creates a reduced flow space or void downstream of the respective tuft 215 which a portion of the wind flow the fills with the reverse current 316 moving contra-flow toward the tuft 215. The micro-eddy turbulence created by wind flow and reverse backfilling current creates a turbulent air flow under the spaced planar modules 11. Some portion of the turbulent air flow exits 310 through the close space 312 between adjacent modules 11.

Similarly, the wind flow 303 below the boundary layer 300 and above the modules 11 is turbulent with introduction of exiting wind flow through the exits 310 between adjacent modules 11. The turbulent wind flow 303 and 305 surprisingly cooperatively resist the wind uplift force that would otherwise affect uplift force on the planar module and thereby prevent the modules from uplift movement from the tufted geosynthetic.

In the illustrated embodiment, the spaced photovoltaic modules 11 mount with spacers 320 of different lengths to orient the modules 11 at an oblique angle relative to the tufted geo synthetic 41.

South Facing Installations
    modules mounted from 0 degrees (horizontal) to 20 degrees East/West Facing Installations
    modules mounted from 0 degrees (horizontal) to 10 degrees The photovoltaic modules accordingly mount substantially horizontally to about a slight oblique angle relative to the ground, facilitating highly dense spacing of the modules for energy generation with solar energy.

Alternatively, the modules mount with same length spacers or directly to the rail horizontally relative to the tufted geosynthetic (i.e., at 0 degrees).

The spacing of the solar photovoltaic modules 11 in the array 280:
- In respective rows first distance apart at between 0.25 inches to 80 inches
- In adjacent rows second distance apart at between 0.25 inches to 80 inches
- The apex spacing of arrays disposed at oblique angles as illustrated in FIG. 25 at between 0.25 inches to 12 inches
- In string spacing of adjacent arrays at between 1 inch to 160 inches
- the photovoltaic modules mount at a third distance relative to the surface at about a 1 inch to about 48 inch gap for an angled photovoltaic module, providing air flow space therethrough In an illustrative embodiment having a first array of solar photovoltaic modules disposed in spaced-apart relation in a plurality of spaced-apart rows, with a second array of solar photovoltaic modules disposed in spaced-apart relation in a plurality of spaced-apart rows, with the first and the second arrays spaced a fourth distance apart for a worker passage therebetween. Further, in the illustrative embodiment, a third array of solar photovoltaic modules disposed in spaced-apart relation in a plurality of spaced-apart rows, with a respective adjacent row of the second and third arrays spaced a fifth distance apart for a vehicle passage therebetween.

The fourth distance in a range from about 1 inch to about 160 inches for a workman pathway for access to servicing the respective array, preferable about 3 feet, but may be between about 4 feet and 10 feet, for accommodating a service vehicle in the worker passage.

Similarly, the fifth distance is between about 1 inch to about 160 inches for a workman pathway for access to servicing the respective array, preferable about 3 feet, but may be between about 4 feet and 10 feet, for accommodating a service vehicle in the worker passage.

In an illustrative embodiment, the workman pathway between a first array and a second array has a width (fourth distance) of between about 12 inches and 48 inches, and more preferably about 36 inches for walking room, and the workman pathway between a second array and a third array has a width (fifth distance) of about 4 feet and 10 feet, and more particularly, about 8 feet for accommodating passage of service vehicles.

The spacing between adjacent arrays of solar photovoltaic modules is based on accommodating workman access (walking beside or working space) and motor vehicle access (for moving replacement panels or other equipment), for installation and servicing of the modules.

The disclosed highly dense array structure in accordance with the present invention provides an increased number of solar photovoltaic modules per unit area of land occupied by a solar installation compared with traditional ground mount racking systems. The highly dense spacing provides an increased electric generation capacity even though the solar photovoltaic modules are oriented flat, or substantially flat that is no more than a slight oblique angle (up to about 20 degrees) relative to the ground surface, rather than "optimally" mounted at a particular angle relative to the sun as taught by tradition solar photovoltaic modules racking systems. The highly dense array occupies less land area which reduces land disturbance for installation of a solar energy generation site. The site may be a greenspace installation covered with a geosynthetic for resisting growth of vegetation. In a preferred embodiment, the highly dense array structure mounts to a tufted geosynthetic ground cover. The tufted geosynthetic ground cover provides very low maintenance costs derived from elimination of a need to cut and mow the vegetation that grows on soil-based closure systems of large area land sites. This lack of maintenance activities on the site cover system and around the solar panels mitigates damage to the solar panels which may be caused by inadvertent contacts by the maintenance equipment. Further, the highly dense array structure of spaced solar photovoltaic modules has reduced electrical grounding requirements because of being installed on a plastic cover. The close proximity of the substantially horizontal solar photovoltaic modules to the tufted geosynthetic ground cover (i) reduces soiling of the solar photovoltaic modules from dust and dirt (with resultant reduced panel cleaning maintenance) and (ii) reduces risk of wind uplift of the solar photovoltaic modules by disposing the solar photovoltaic modules below a boundary layer of a free stream wind flow over the upper surface and forming micro-eddy turbulence proximate the tufts of the cover system from air flow below the solar photovoltaic modules with the spacing gaps between adjacent solar photovoltaic modules providing flow exits for the turbulent wind flow under the solar photovoltaic modules. The seating of the highly dense array structure in spaced-relation (vertical, longitudinal, and lateral) to the tufted geosynthetic ground cover enables minimal ballasting yet the structure installed on the tufted geosynthetic ground cover is resistant to sliding creep and wind uplift loading.

While the preferred illustrative embodiments disclosed herein are non-ballasted systems, it is to be appreciated that certain application sites may benefit from minimal ballasting to offset to possibly significantly increased wind uplift forces, for example at crests of slopes or hills at landfills or land sites and areas proximate to crests or apexes. Proximate to the crest refers to the apex and areas within 15 to about 30 feet of the apex. Typically, photovoltaic panels are 4 feet wide by 8 feet long, and spacing of the edge of the array of photovoltaic panels proximate the crest reduces the exposure of an edge of the installed array system to the possibly increased wind uplift.

Further Mounting Systems

Figure 13:
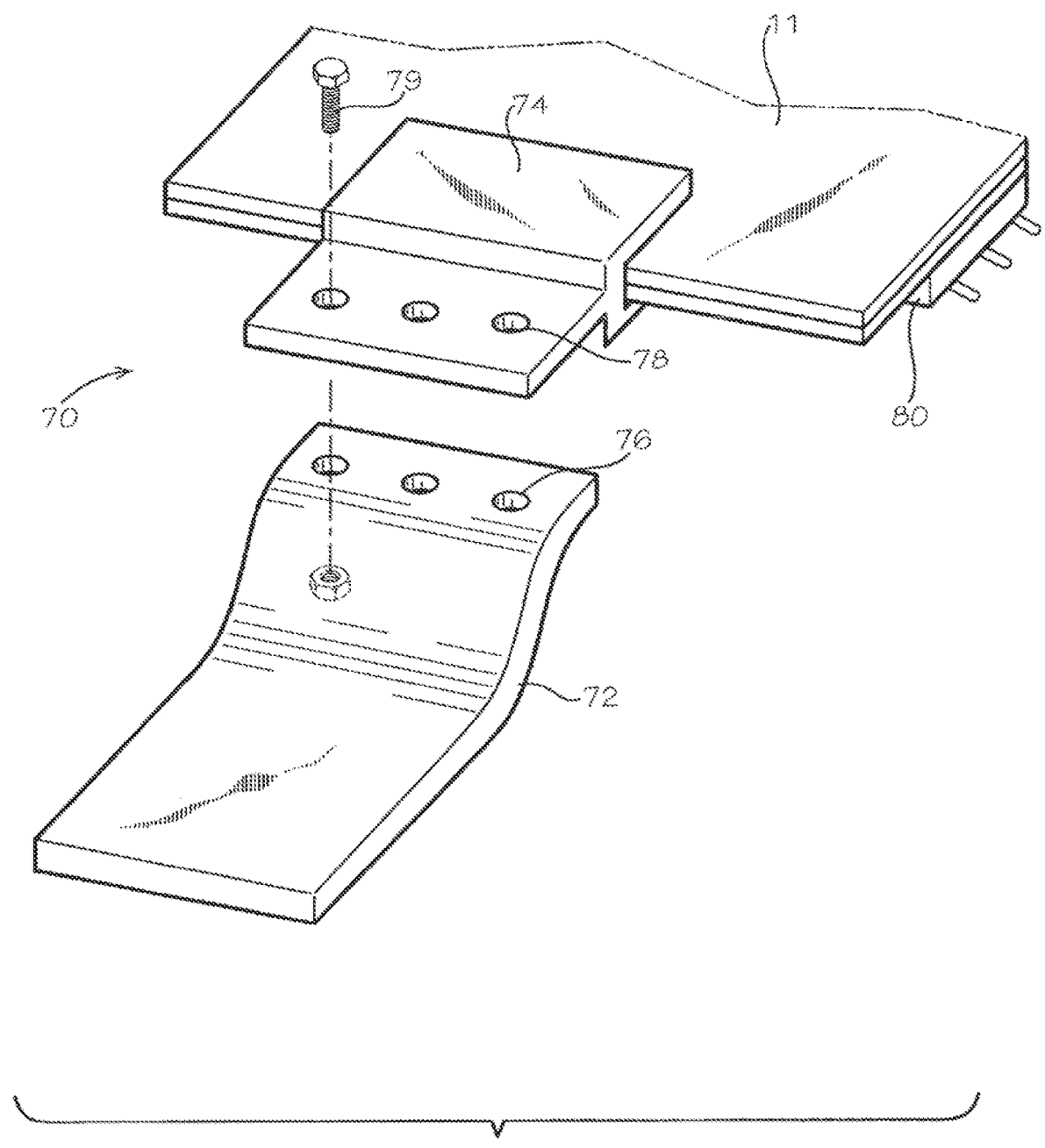
FIG. 13 illustrates a perspective view of the mounting system in yet another preferred form.

With reference next to FIG. 13, there is shown a solar panel 11 and mounting system 70 in another preferred form of the invention. Here, a weld harness strip 72 is mounted directly to a side edge mounting bracket 74. The weld harness strip 72 includes mounting holes 76 which are aligned with mounting holes 78 in the side edge mounting bracket 74. A fastener 79, such as a mounting bolt, is passed through the mounting holes 76 and 78. Anti-creep strips 80 may be attached to the bottom of solar panel 11.

In use, the weld harness strip 72 is once again welded to the strands or yarns of the underlying tufted geosynthetic material, as previously discussed.

Figure 16:
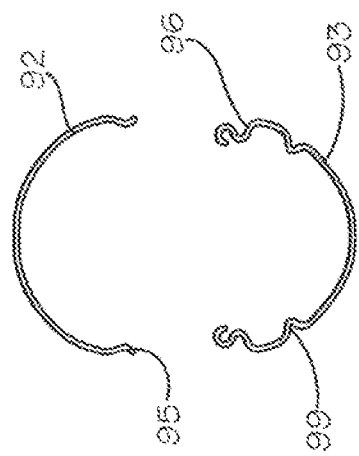
FIG. 16 illustrates an exploded end view of the wiring tray system of FIG. 14.
Figure 15:
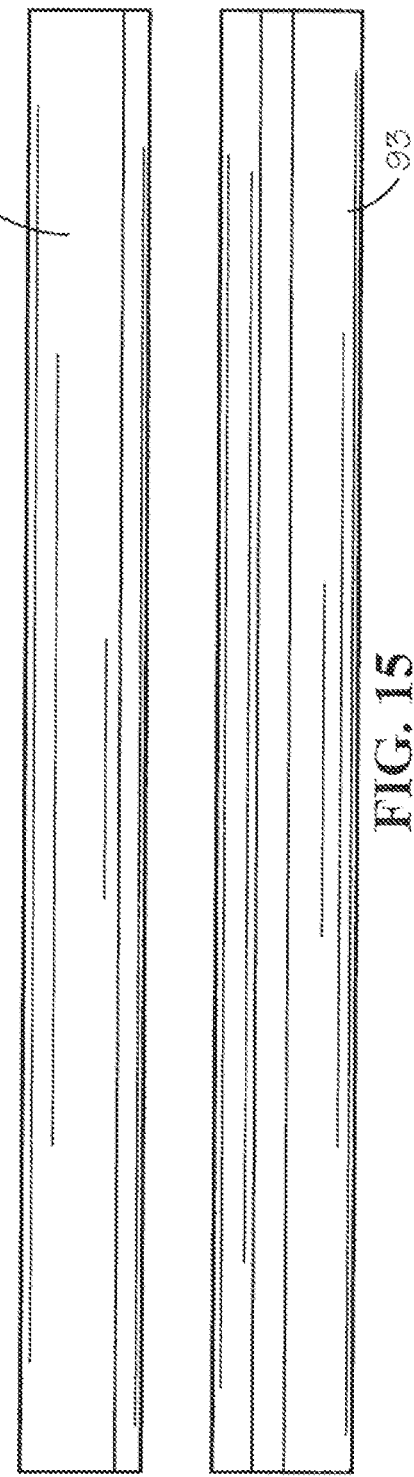
FIG. 15 illustrates a side view of the wiring tray system of FIG. 14.
Figure 14:
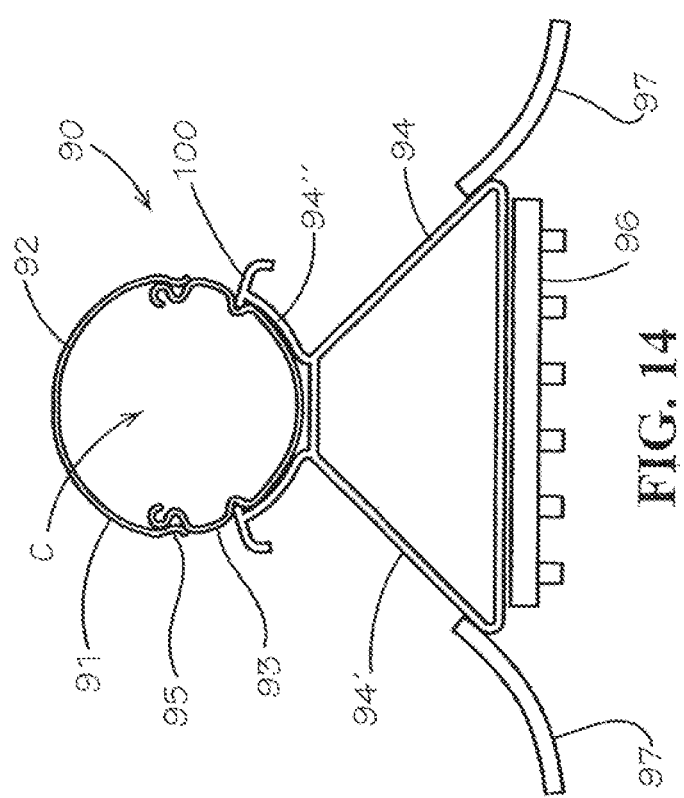
FIG. 14 illustrates an end view of a wiring tray system for solar panels in a preferred form.

With reference next to FIGS. 14-16, there is shown a wire tray system 90 for a solar panel mounting system for tufted geosynthetic material in a preferred form of the invention. The wire tray system 90 includes a hollow conduit 91 having a top portion 92 and a bottom portion 93 snap fitted to top portion 92, the conduit 91 forming a channel C through which the wiring of the solar panels may be positioned. The wire tray system 90 also includes a base, foot or stand 94 which is snap fitted to the conduit 91.

The top portion 92 is generally a half cylinder having ends 95 in the form of tangs that are releasably received within longitudinal grooves 96 along the upper ends of the bottom portion 93. The bottom portion 93 also being in the form of a half cylinder and includes longitudinal stand grooves 99.

The stand 94 has a bottom portion 94' is generally triangular in shape and includes an anti-creep strip 96 coupled to the bottom surface of the stand 94. The stand bottom portion 94' also includes oppositely disposed weld harness strips 97. Lastly, the stand bottom portion 94' includes a pair of oppositely disposed longitudinal catches 100 which are configured to be releasably received within the longitudinal grooves 99 of the conduit bottom portion 93.

In use, the weld harness strips are welded or otherwise coupled to the yarn of the tufted geosynthetic material, as previously discussed. Again, the anti-creep strip 96 prevents relative movement of the wire tray system 90 relative to the tufted geosynthetic material.

The conduit top portion 92 may be easily released from the conduit bottom portion 93 to provide easy access to the wiring within the conduit 91. Also, the entire conduit 91 may be easily removed from the stand 94 for replacement purposes.

Figure 17:
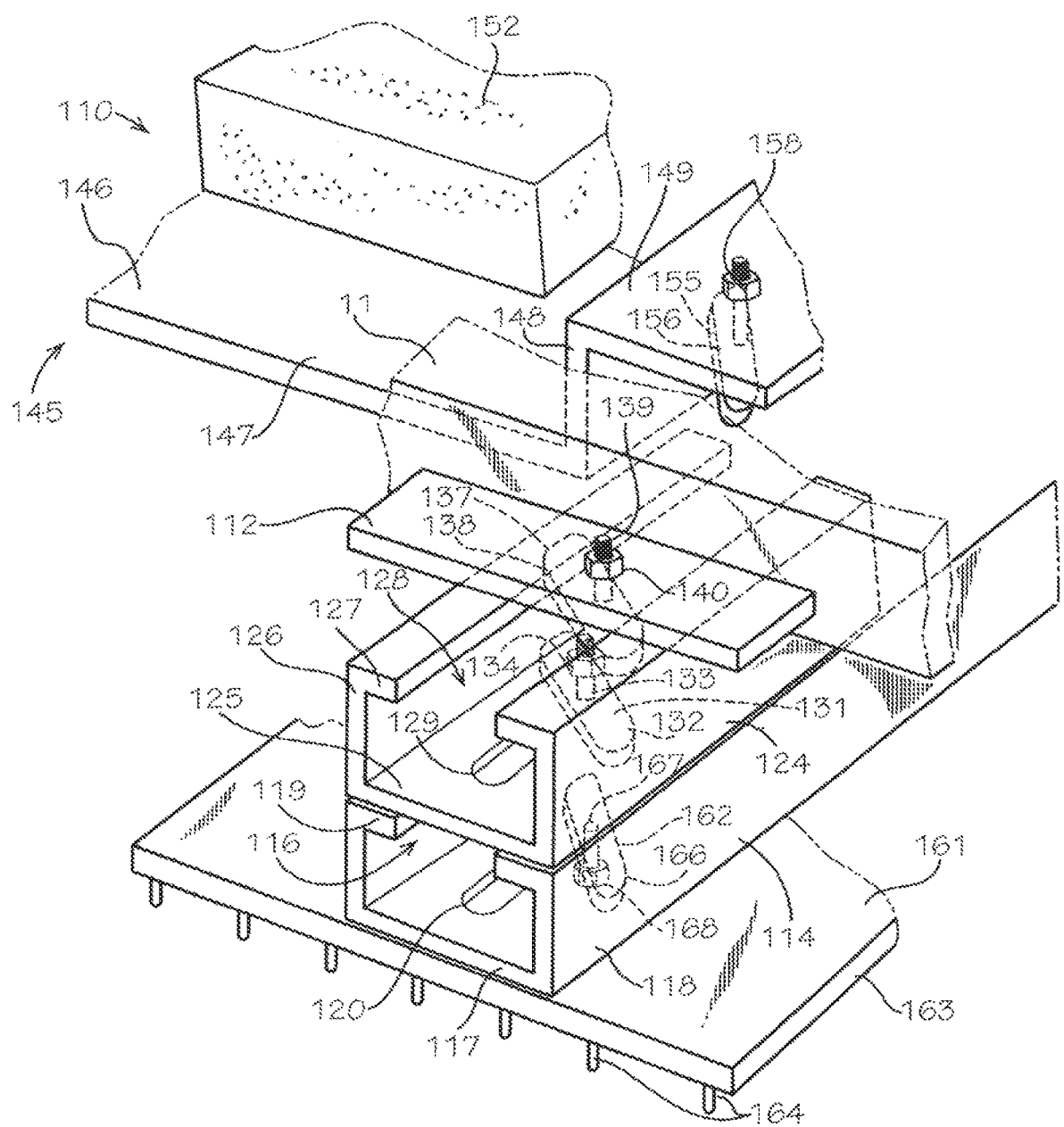
FIG. 17 illustrates a perspective view of a mounting system in yet another preferred form.
Figure 18:
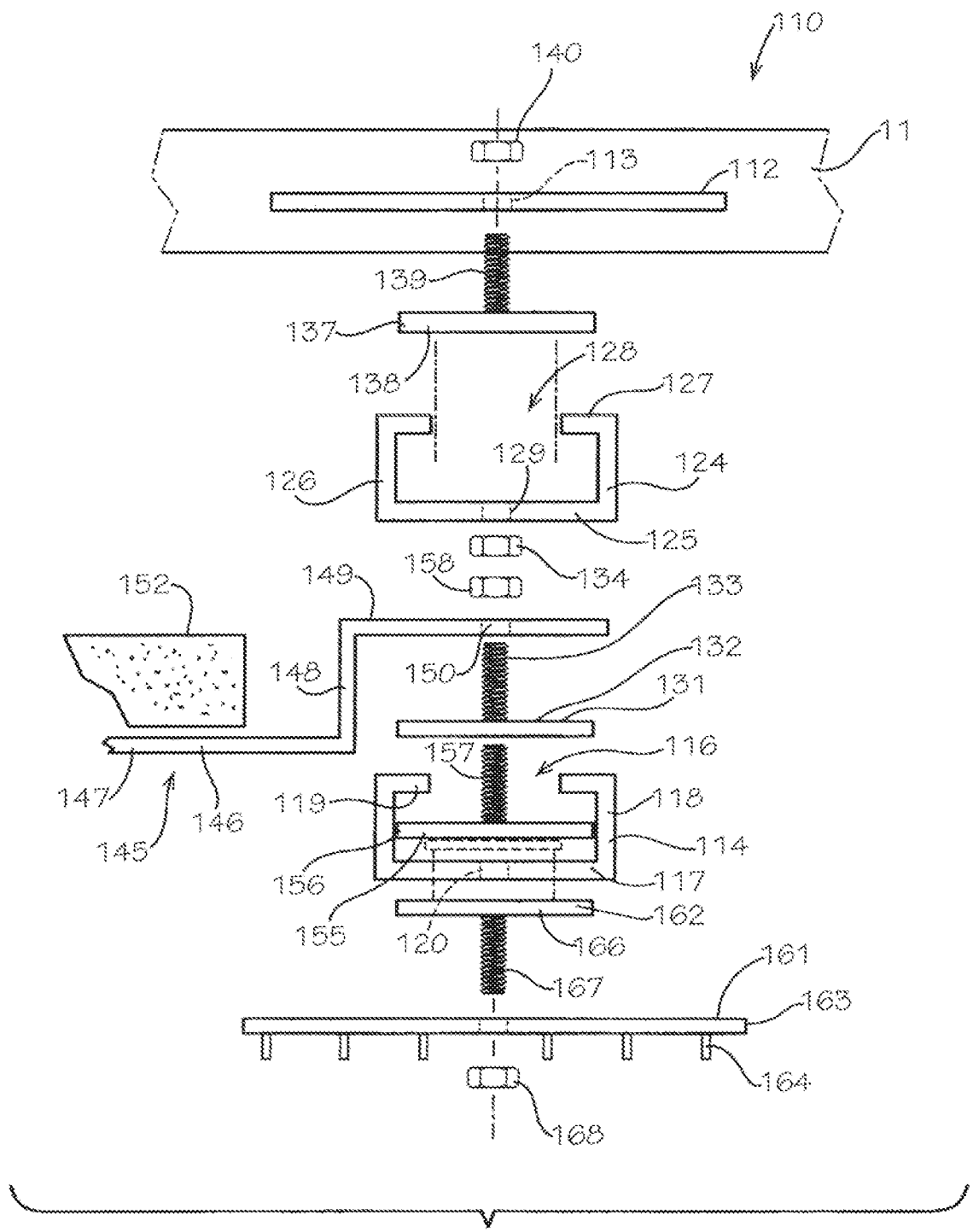
FIG. 18 illustrates an exploded, end view of the mounting system of FIG. 17.

With reference next to FIGS. 17 and 18, there is a shown a solar panel 11 and mounting system 110 in another preferred form of the invention. Here, the mounting system 110 includes a side edge mounting bracket 112 which may be formed as part of the solar panel 11, but which alternatively may be formed similar to bracket 50 shown in FIGS. 9 and 10. The mounting bracket 112 includes a mounting hole 113 therethrough. In this embodiment, the mounting system 110 includes ballast; therefore, the need for a welding strip is optional.

The system 110 includes a generally U-shaped, elongated base plate 114 having an elongated mounting slot or channel 116 defined by a generally planar, elongated base member 117 and two oppositely disposed elongated, vertically oriented channel walls 118 having inwardly extending lips or flanges 119. The base member 117 includes a series of elongated mounting holes 120. It should be understood that the system includes pairs of like components to complete the system, i.e., pairs of base members 117, spacers beams 124, corresponding fasteners, and the like.

The system also includes an elongated U-shaped spacer beam or rail 124 having a horizontal lower member 125, two oppositely disposed side walls 126 each having an inwardly extending lip or flange 127 defining a slot or channel 128 therebetween. The lower member 125 has mounting holes 129 therethrough. A first T-shaped fastener 131 having an elongated mounting plate 132 and an externally threaded mounting post 133 which extends through the spacer beam mounting hole 129 and is threadably coupled to an internally threaded first mounting nut 134. The spacer beam 124 is selectively, releasably coupled to and slideable relative to the underlying and longitudinally aligned base member 117 for slideable movement therebetween through a force placed upon the spacer beam 124 through the loosening of first mounting nut 134 and locked in place by the tightening of first mounting nut 134. The width of the mounting plate 132 is slightly smaller than the size (width) of the mounting slot 116 while the length of the mounting plate 132 is larger than the size (width) of the mounting slot 116, so that the mounting plate 132 may be passed through the slot 116 and then rotated so that it then cannot pass back through the slot 116. The corners of the mounting plate 132 are rounded so that they may bear against the interior surface of the channel walls 118.

A second T-shaped fastener 137 having an elongated mounting plate 138 and an externally threaded mounting post 139 is coupled to the spacer beam 124. The threaded mounting post 139 extends through the slot 128, through the mounting hole 113 in mounting bracket 112 and is threadably coupled to an internally threaded second mounting nut 140. The solar panel 11 is selectively, releasably coupled to and slideable relative to the underlying spacer beam 124 for slideable movement therebetween for mounting and adjustment purposes through the loosening of second mounting nut 140 and locked in place by the tightening of second mounting nut 140. The width of the mounting plate 138 is slightly smaller than the size (width) of the mounting slot 128 while the length of the mounting plate 138 is larger than the size (width) of the mounting slot 128, so that the mounting plate 138 may be passed through the slot 128 and then rotated so that it then cannot pass back through the slot 128. The corners of the mounting plate 138 are rounded so that they may bear against the interior surface of the spacer beam side walls 126.

The mounting system 110 also includes a ballast system 145 which is releasably and slideably coupled to the base member 117. The ballast system 145 includes a ballast tray 146 having a floor 147, two oppositely disposed side walls 148 and a mounting flange 149 extending outwardly from each side wall 148. Each mounting flange 149 has two mounting holes 150 therethrough. One of more ballast modules 152, preferably in the form of concrete slabs, may be positioned upon the floor 147 of the ballast tray 146, to provide adequate weight to prevent the solar panels 11 and the mounting system 110 from being displaced. The ballast tray 146 may be made of a metal or other suitable material.

A third T-shaped fastener 155 having an elongated mounting plate 156 and an externally threaded mounting post 157 which extends through the ballast tray mounting hole 150 and is threadably coupled to an internally threaded third mounting nut 158. The ballast tray 146 is selectively, releasably coupled to and slideable relative to the underlying base member 117 for slideable movement therebetween through a force placed upon the ballast tray 146 through the loosening of third mounting nut 158 and locked in place by the tightening of third mounting nut 158. The width of the mounting plate 156 is slightly smaller than the size (width) of the mounting slot 116 while the length of the mounting plate 156 is larger than the size (width) of the mounting slot 116, so that the mounting plate 156 may be passed through the slot 116 and then rotated so that it then cannot pass back through the slot 116. The corners of the mounting plate 156 are rounded so that they may bear against the interior surface of the channel walls 118.

Lastly, the mounting system 110 includes anti-creep strips 161 which are coupled to each base member 117 through fourth T-shaped fasteners 162. The anti-creep strips 161 include a generally planar support 163 and an array or arrangement of downwardly extending feet or projections 164. The anti-creep strip 161 may be made of a polymer material or the like. The fourth T-shaped fastener 162 have an elongated mounting plate 166 and an externally threaded mounting post 167 which extends through the base member elongated mounting holes 120 and is threadably coupled to an internally threaded fourth mounting nut 168. The width of the mounting plate 166 is slightly smaller than the size (width) of the mounting slot 116 while the length of the mounting plate 166 is larger than the size (width) of the mounting slot 116, so that the mounting plate 166 may be passed through the slot 116 with the mounting post 167 extending through the elongated mounting hole 120 and secured with fourth nut 168 to secure the anti-creep strip 161 to the base plate 114. The corners of the mounting plate 132 are rounded so that they may bear against the interior surface of the channel walls 118.

Figure 20:
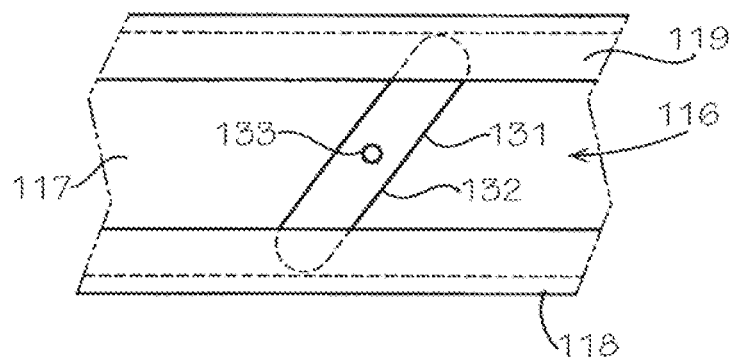
FIG. 20 illustrates a top view of a portion of the mounting system of FIG. 17.

It should be understood that the first, second, third and fourth T-shaped fasteners 131, 137, 155, and 162 are preferably all the same to provide less inventory and easy exchange of pieces. These fasteners pass through the slots or holes (113, 116, and 128) and bind upon rotation so that they do not need to be held in place with a tool during installation, as shown in FIG. 20.

In use, the anti-creep strip 161 prevents relative movement of the mounting system 110 relative to the tufted geosynthetic material. The array of downwardly extending feet or projections 164 inter-engage with the tufts for frictionally resisting movement relative to the tufted geosynthetic.

Figure 19:
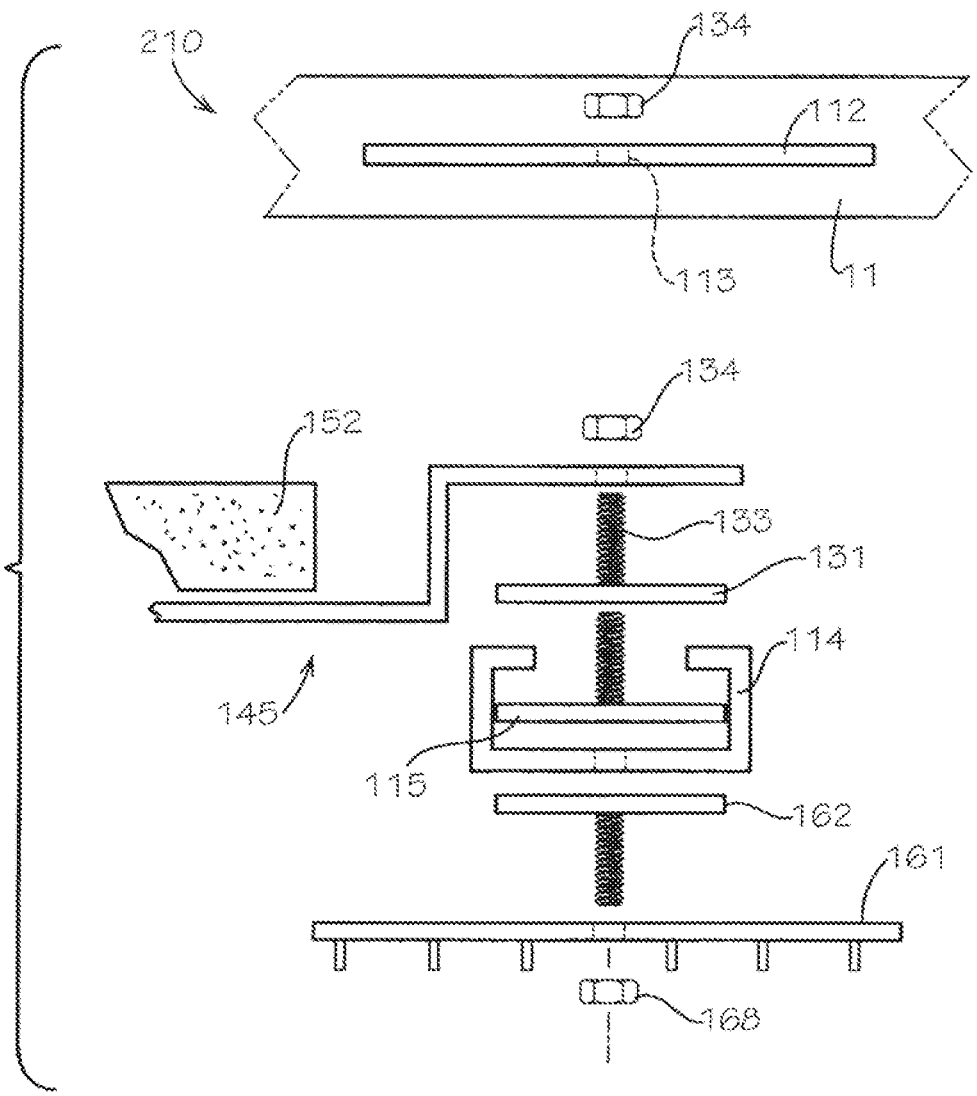
FIG. 19 illustrates an end view of the mounting system of FIG. 17 shown with the spacer removed.

With reference next to FIG. 19, there is a shown a solar panel 11 and mounting system 210 in another preferred form of the invention. Here, the mounting system 210 is essentially the same as that shown in reference to FIGS. 17 and 18 except that the spacer beam 124 and its correlating parts are not included.

With the absence of the spacer beam 124, the first T-shaped fastener 131 is coupled directly to the solar panel 11 with the mounting post 133 extending through the mounting hole 113 within the solar panel mounting bracket 112. The first mounting nut 134 is threaded upon the mounting post 133 to secure the solar panel 11 in place. This configuration may be preferred when a large amount of ventilation below the solar panel is not required.

Figure 21:
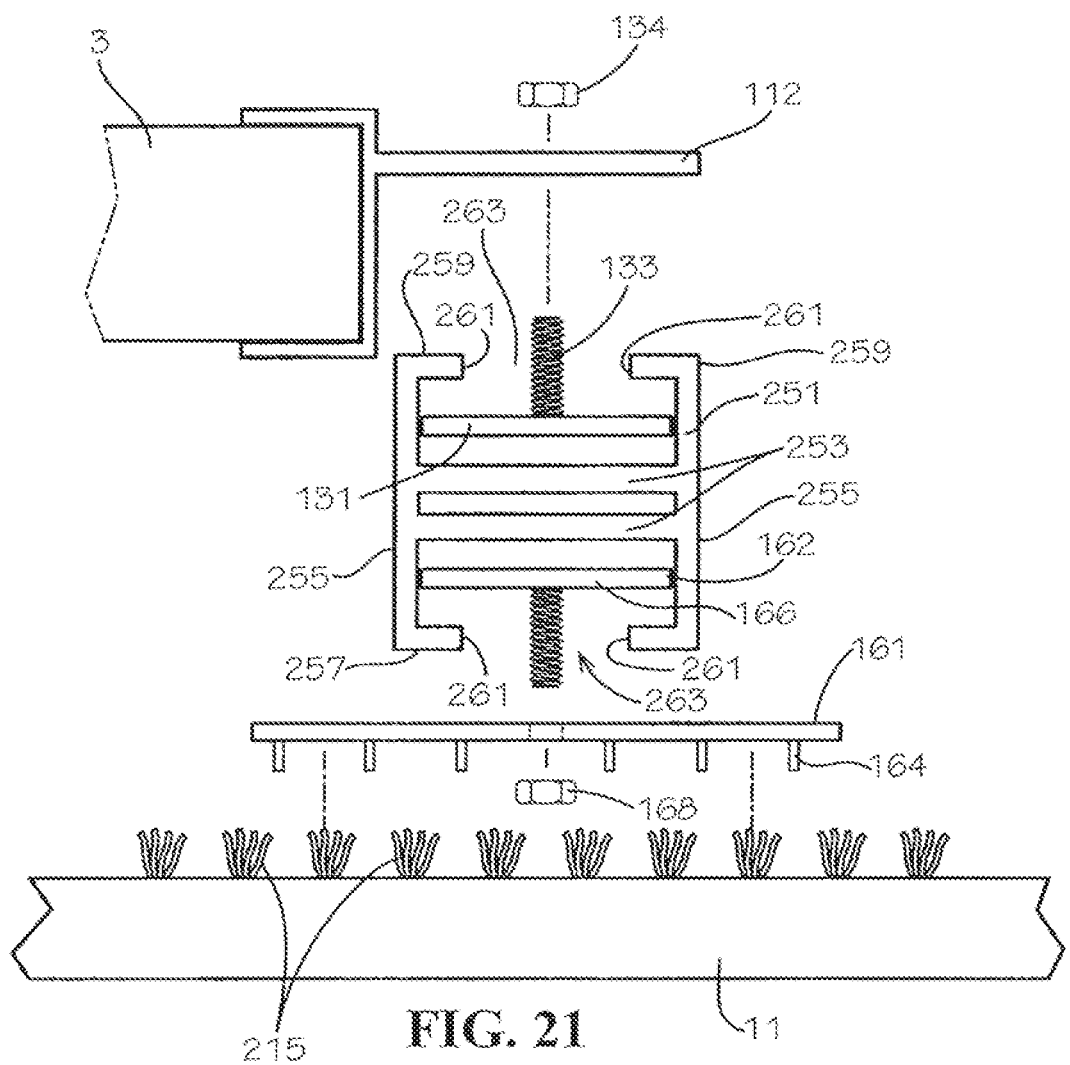
FIG. 21 illustrates a perspective view of an alternate embodiment of a rail for use with photovoltaic module mounting system in yet another preferred form.

FIG. 21 illustrates an end view of an alternate embodiment of the mounting system shown in FIG. 17, using a one-piece extruded rail 251 (as the base plate referenced above). The rail 251 comprises an elongated member having at least one web 253 attached to opposing side walls 255. The illustrated embodiment includes a pair of webs 253. The sides walls 255 define a channel 256 and opposing profiles for a base 257 for contacting the attaching connection 188 and an opposing seat 259 for connecting to the bracket 112 of the photovoltaic module 11. The bracket 112 may be integral with the photovoltaic module 11 as supplied by the module manufacturer, or may be part of a Y-shaped bracket similar to bracket 50 shown in FIGS. 9 and 10 for engaging a side edge of the module.

The side walls 255 have inwardly extending lips or flanges 261, respectively, and each pair defines a respective slot 263 therebetween for the base 257 and for the seat 259. A plurality of fasteners 162 secure the rail 251 to the anti-creep strip 161. The post of the fastener extends though the slot 263 and through the anti-creep strip 161. Upon rotating, the plate 166 on the flanges 261 bears on the side walls 255, and the nut 168 threads on the post to secure the attaching connection 188 to the rail 251. The feet 164 extending from the anti-creep strip than engages the tufts 215 of the geosynthetic cover 11. The photovoltaic module 3 then rests with the bracket 112 on the seat 259. A post 133 of a fastener 131 extends upwardly through the slot 263 in the seating end 259, and through the opening in the bracket 112. The plate 132 rotates into engagement with the side walls 255. The nut 134 threadably engages the post 133 to secure the photovoltaic module 11 to the rail. Although not illustrated, a spring attached to the plate may assist by holding the plate between the web 253 and the flanges 261 in contact with the flanges 261 until the nut secures the fastener to the rail.

It should be understood that in these embodiments the weld harness strip is preferably made of a polyethylene material. Similarly, the yarns of the tufted geosynthetic material are also made of a polyethylene material. With this construction, the melting point of the weld harness strip is generally that of the yarns of the tufted geosynthetic material, thereby creating a superior bold or weld there between. However, it should be understood that other types of polymer materials may also be used for these components without departing from the scope of the invention.

The distinct advantage to the invention described in the multiple embodiments herein is that the solar panels may be positioned or arranged in a manner that provides for a higher density of solar panels per area of land. This higher density allows for the generation of more electricity per land area. Another advantage is the easy of mounting solar panels without the need for a racking system or without the occurrence of panel movement over time.

The wind breaking element, such as members 219, readily attach to the photovoltaic module 3, or alternatively, to the bracket 50 or 112, for wind uplift resistance, by creating turbulent flow near the surface of the cover, thus greatly reducing the actual wind velocity at the cover surface and decreasing associated uplift.

In all embodiments wherein two base plates, spacers, or rails are shown, it should be understood that the invention may include at least one such component, however, such an arrangement is not preferred.

The foregoing discloses in alternate embodiments the electricity generating apparatus of the at least one array of a plurality of solar photovoltaic modules mounted on supports spaced from the surface and interconnected in spaced relation for a gap therebetween. It is to be appreciated that while invention has been described with particular reference to certain embodiments, variations and modifications can be made without departing from the spirit and scope of the invention as recited in the appended claims.

What is claimed is:

1. An assembly of a plurality of solar photovoltaic modules for generating electricity at a large area land site, comprising:

a tufted geosynthetic overlying a surface of a large area land site, said tufted geosynthetic having a plurality of spaced apart tufts extending as simulated blades of grass;

an assembly of a plurality of solar photovoltaic modules, said assembly comprising a first array, a second array and a third array each comprising respective ones of the plurality of solar photovoltaic modules disposed in a plurality of adjacent rows with a respective solar photovoltaic module spaced a first distance from an adjacent solar photovoltaic module and adjacent ones of the plurality of rows spaced a second distance apart;

a plurality of supports for positioning the plurality of solar photovoltaic modules for the respective array at least a third distance relative to the tufted geosynthetic overlying the large area land site for a low profile relative to wind, each support comprising an elongated rail and an anti-creep strip attached to the elongated rail and said anti-creep strip having a plurality of projections extending in a first direction therefrom for engaging contact with a portion of the plurality of spaced-apart tufts of the tufted geosynthetic; and a plurality of connectors, whereby at least one of the connectors connects a respective solar photovoltaic module of the plurality of solar photovoltaic modules to a respective one of the elongate rails, wherein each respective solar photovoltaic module of the plurality of solar photovoltaic modules being attached to at least one of the elongated rails, is disposed vertically spaced at least the third distance from the tufted geosynthetic; and whereby the plurality of photovoltaic modules being disposed vertically from the tufted geosynthetic define the respective low-profile array that resists wind uplift while generating electricity;

the second array of the plurality of solar photovoltaic modules for generating electricity spaced from the first array a fourth distance for a worker passage between the first array and second arrays, said fourth distance greater than said first distance; and the third array of the plurality of solar photovoltaic modules spaced from the second array a fifth distance, said fifth distance greater than the fourth distance for a vehicle passage between the second and third arrays.

2. The assembly as recited in claim 1, wherein the first distance is in a range from about 0.25 inch to about 80 inches.

3. The assembly as recited in claim 1, wherein the third distance is in a range from about 1 inch to about 48 inches.

4. The assembly as recited in claim 1, wherein the fifth distance is between about 4 feet and 10 feet, for accommodating a service vehicle.

5. A method of arranging adjacent arrays each of a plurality of solar photovoltaic modules for generating electricity, comprising the steps of:

(i) overlying a surface with a tufted geosynthetic having a plurality of spaced-apart tufts extending as simulated blades of grass;

(ii) providing a plurality of supports for supporting a plurality of solar photovoltaic modules spaced vertically at a third distance from the tufted geosynthetic to define a low-profile to wind relative to the tufted geosynthetic, each support comprising an elongated rail and an anti-creep strip attached to the elongated rail and said anti-creep strip having a plurality of projections extending in a first direction therefrom for engaging contact with a portion of the plurality of spaced-apart tufts of the tufted geosynthetic, each said one of the supports disposed spaced from an adjacent one of the supports;

(iii) positioning a first array of the plurality of solar photovoltaic modules in adjacent rows for generating electricity, comprising the steps of:
   (a) positioning respective ones of the plurality of solar photovoltaic modules on a respective pair of said plurality of supports, said solar photovoltaic modules disposed with adjacent solar photovoltaic modules spaced a first distance apart; and
   (b) positioning a plurality of supports spaced a second distance apart;
   (c) connecting adjacent solar photovoltaic modules to a respective pair of supports with a respective one of a plurality of connectors, said solar photovoltaic modules defining a respective array that resists wind uplift while generating electricity;

(iv) positioning the second array of the plurality of solar photovoltaic modules for generating electricity according to the steps (a) (b), and (c), the second array-spaced a fourth distance from the first array for a worker passage between the first and second arrays, said fourth distance greater than said first distance; and (v) positioning a third array of solar photovoltaic modules according to the steps (a), (b), and (c), said third array spaced a fifth distance from the second array, the fifth distance greater than the fourth distance for a vehicle passage between the second and third arrays.

6. The assembly as recited in claim 1, further comprising a spacer between the elongated rail and the connector for disposing said respective solar photovoltaic module with a solar sensitive face at a low-profile angle from about horizontal to about 20 degrees relative to the tufted geosynthetic.

7. The assembly as recited in claim 1, wherein the first distance is about 0.5 inches, the third distance is about 12 inches at a lowermost connection to the elongated rail, the fourth distance is about 4 feet for the worker passageway, and the fifth distance is about 8 feet for the vehicle passageway.

8. The method as recited in claim 5, further comprising the step of angling the respective solar photovoltaic modules to have a solar sensitive face at an angle from about horizontal to about 20 degrees relative to the surface.

9. The assembly as recited in claim 1, wherein the fourth distance is between about 12 inches and 48 inches for the worker passageway between the first and second arrays.

10. The method as recited in claim 5, wherein the positioning of the solar photovoltaic modules at the first distance is in a range from about 0.25 inch to about 80 inches.

11. The method as recited in claim 5, wherein the positioning of the solar photovoltaic modules at the third distance is in a range from about 1 inch to about 48 inches.

12. The method as recited in claim 5, wherein the positioning of the fourth distance of the worker passageway between the first and second arrays is between about 12 inches and 48 inches.

13. The method as recited in claim 5, wherein the positioning of the fifth distance of the vehicle passageway between the second and third arrays is between about 4 feet and 10 feet, for accommodating a service vehicle.

* * * * *